(12) United States Patent
Quan et al.

(10) Patent No.: US 10,728,920 B2
(45) Date of Patent: Jul. 28, 2020

(54) METHOD, APPARATUS, AND SYSTEM FOR CONTROLLING DATA TRANSMISSION

(71) Applicant: Huawei Technologies Co., Ltd., Shenzhen, Guangdong (CN)

(72) Inventors: Wei Quan, Beijing (CN); Zhenxing Hu, Shenzhen (CN); Jian Zhang, Beijing (CN); Pengyu Ji, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 173 days.

(21) Appl. No.: 15/196,876

(22) Filed: Jun. 29, 2016

(65) Prior Publication Data

US 2016/0309503 A1 Oct. 20, 2016

Related U.S. Application Data

(63) Continuation of application No. PCT/CN2013/091250, filed on Dec. 31, 2013.

(51) Int. Cl.
*H04W 72/12* (2009.01)
*H04W 76/20* (2018.01)
*H04W 74/08* (2009.01)

(52) U.S. Cl.
CPC ... *H04W 72/1278* (2013.01); *H04W 72/1268* (2013.01); *H04W 74/0833* (2013.01); *H04W 76/20* (2018.02)

(58) Field of Classification Search
CPC ......... H04W 72/1278; H04W 74/0833; H04W 76/04; H04W 72/1268
See application file for complete search history.

(56) References Cited

U.S. PATENT DOCUMENTS

| 2006/0056447 A1* | 3/2006 | Farnsworth | H04W 48/08 |
| | | | 370/466 |
| 2008/0049694 A1* | 2/2008 | Kinoshita | H04W 88/06 |
| | | | 370/338 |
| 2008/0205433 A1* | 8/2008 | Pihlaja | H04W 74/004 |
| | | | 370/461 |

(Continued)

FOREIGN PATENT DOCUMENTS

| CN | 101192878 A | 6/2008 |
| CN | 101242398 A | 8/2008 |

(Continued)

OTHER PUBLICATIONS

"SR Prohibit Timer", Ericsson, 3GPP TSG-RAN WG2 #67bis, Oct. 12-16, 2009, 9 pages, R2-095795.

(Continued)

*Primary Examiner* — Andrew Lai
*Assistant Examiner* — Harry H Kim
(74) *Attorney, Agent, or Firm* — Slater Matsil, LLP

(57) ABSTRACT

An embodiment of the present invention discloses a method for controlling data transmission, where the method includes: receiving, by user equipment UE, at least one transmission control parameter transmitted by a base station; and when the UE needs to initiate data transmission to the base station, applying, by the UE, the transmission control parameter to control data transmission. An embodiment of the present invention further discloses a terminal device.

20 Claims, 7 Drawing Sheets

(56) References Cited

U.S. PATENT DOCUMENTS

| | | |
|---|---|---|
| 2010/0040028 A1 | 2/2010 | Maheshwari et al. |
| 2010/0098011 A1* | 4/2010 | Pelletier ............ H04W 72/1242 370/329 |
| 2012/0069805 A1* | 3/2012 | Feuersanger ..... H04W 72/1284 370/329 |
| 2012/0269156 A1 | 10/2012 | Quan et al. |
| 2013/0227582 A1 | 8/2013 | Daly et al. |
| 2014/0064219 A1 | 3/2014 | Quan et al. |
| 2015/0043547 A1 | 2/2015 | Pelletier et al. |
| 2015/0071260 A1* | 3/2015 | Chun .................... H04L 1/1848 370/336 |
| 2015/0156780 A1* | 6/2015 | Kim ...................... H04L 5/0035 370/331 |
| 2016/0150440 A1* | 5/2016 | Lee .................... H04W 28/0278 455/422.1 |

FOREIGN PATENT DOCUMENTS

| | | |
|---|---|---|
| CN | 101873704 A | 10/2010 |
| CN | 101998522 A | 3/2011 |
| CN | 102118799 A | 7/2011 |
| CN | 102149080 A | 8/2011 |
| CN | 102257869 A | 11/2011 |
| CN | 102291772 A | 12/2011 |
| CN | 102685895 A | 9/2012 |
| CN | 102761967 A | 10/2012 |
| EP | 2530993 A1 | 12/2012 |
| EP | 2661138 A1 | 11/2013 |
| EP | 2675081 A1 | 12/2013 |
| WO | 2014/070901 A1 | 5/2014 |

OTHER PUBLICATIONS

"3rd Generation Partnership Project; Technical Specification Group Radio Access Network; Evolved Universal Terrestrial Radio Access (E-UTRA); Medium Access Control (MAC) protocol Specification (Release 11)", 3GPP TS 36.321 V11.3.0, Jun. 2013, 57 pages.

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.5.0, Sep. 2013, 347 pages.

\* cited by examiner

A base station transmits information to UE, where the information carries at least one transmission control parameter, and the information includes at least one of a system broadcast message, a paging message, an RRC message, or a MAC message  ／S600

FIG. 7

A base station transmits at least one transmission control parameter to UE, so that the UE applies the transmission control parameter to control data transmission when the UE needs to initiate data transmission  ／S700

The base station transmits a command for enabling the transmission control parameter corresponding to the RB to the UE  ／S701

FIG. 8

When the base station receives a BSR that the UE controls the RB to transmit, the base station returns a control instruction according to the BSR  ／S800

FIG. 9

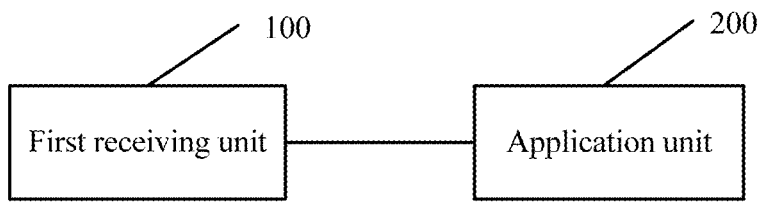

FIG. 10

METHOD, APPARATUS, AND SYSTEM FOR CONTROLLING DATA TRANSMISSION

CROSS-REFERENCE TO RELATED APPLICATION

This application is a continuation of International Application No. PCT/CN2013/091250, filed on Dec. 31, 2013, which is incorporated herein by reference in its entirety.

TECHNICAL FIELD

The present invention relates to the field of communications technologies, and in particular, to a method, an apparatus, and a system for controlling data transmission.

BACKGROUND

In a hotspot area in which an LTE system is applied, when a majority of users in the area perform communication simultaneously for various reasons, or when an activity such as a major gathering or important matches involving a large population takes place, a case in which large quantities of users access the system occurs, resulting in a quick increase of system resource usage, and a case of network overcongestion or overload occurs, and consequently, users that require emergency calls may be unable to access the system to perform communication.

Currently, to resolve a problem that an operator still can ensure that high-priority users can perform communication in a case in which congestion occurs in an LTE system, the operator allocates one or more access classes to common users in a live network. One class in class 0 to class 9 is allocated to each user. For some special users, one or more access classes in access classes 11 to 15 are further allocated. A higher class indicates that a corresponding user has a higher priority. By means of class allocation, when a case of congestion occurs in the system, the operator ensures communication and access of high-priority users by controlling access of low-priority users.

However, the foregoing mechanism is applied to access of user equipment in idle mode. When more user equipments access the network, and there is severe congestion or heavy load in the network, user equipments in connected mode still initiate new service calls or perform data transmission. Consequently, some high-priority user equipments that are really in emergencies are unable to smoothly access the network, and user experience is affected.

SUMMARY

Embodiments of the present invention provide a method, an apparatus, and a system for controlling data transmission, which can effectively improve utilization of network resources and can improve flexibility of data transmission of a UE side.

A first aspect of the embodiments of the present invention provides a method for controlling data transmission, where the method may include:

receiving, by a user equipment UE, at least one transmission control parameter transmitted by a base station; and when the UE needs to initiate data transmission to the base station, applying, by the UE, the transmission control parameter to control data transmission.

With reference to the first aspect, in a first possible implementation manner, the receiving, by the UE, at least one transmission control parameter transmitted by a base station, includes:

receiving, by the UE, information transmitted by the base station, where the information includes at least one of a system broadcast message, a paging message, an RRC message, or a MAC message; and parsing, by the UE, the information to acquire the at least one transmission control parameter.

With reference to the first aspect or the first possible implementation manner of the first aspect, in a second possible implementation manner, the transmission control parameter carries a radio bearer RB identifier; and before the applying, by the UE, the transmission control parameter to control data transmission when the UE needs to initiate data transmission to the base station, the method includes:

acquiring, by the UE, the RB identifier carried in the transmission control parameter; and determining, by the UE, that an RB identified by the RB identifier carried in the transmission control parameter is an RB to be controlled by the transmission control parameter.

With reference to the second possible implementation manner of the first aspect, in a third possible implementation manner, before the applying, by the UE, the transmission control parameter to control data transmission when the UE needs to initiate data transmission to the base station, the method further includes:

receiving, by the UE, a command, transmitted by the base station, for enabling the transmission control parameter of the to-be-controlled RB.

With reference to the second possible implementation manner of the first aspect or the third possible implementation manner of the first aspect, in a fourth possible implementation manner, the applying, by the UE, the transmission control parameter to control data transmission, includes:

applying, by the UE, the transmission control parameter of the to-be-controlled RB to control the to-be-controlled RB to transmit the data to the base station.

With reference to any one of the first aspect to the third possible implementation manner of the first aspect, in a fifth possible implementation manner, before the applying, by the UE, the transmission control parameter to control data transmission when the UE needs to initiate data transmission to the base station, the method includes:

determining, by the UE, whether the data meets a preset transmission condition; and if the data meets the preset transmission condition, performing the step of applying, by the UE, the transmission control parameter to control data transmission.

With reference to any one of the second possible implementation manner of the first aspect to the fifth possible implementation manner of the first aspect, the applying, by the UE, the transmission control parameter to control data transmission, includes:

randomly allocating, by the UE, a numeric value to the data according to the transmission control parameter;

determining, by the UE, whether the numeric value is less than a preset threshold; and controlling, by the UE according to a determining result, the to-be-controlled RB to transmit the data.

With reference to any one of the second possible implementation manner of the first aspect to the fifth possible implementation manner of the first aspect, the data includes a buffer status report data BSR; and the method further includes:

when the UE controls the to-be-controlled RB to transmit the BSR to the base station and receives a control instruction returned by the base station, controlling, by the UE according to the control instruction, the to-be-controlled RB to transmit the BSR to the base station.

With reference to the seventh possible implementation manner of the first aspect, in an eighth possible implementation manner, the BSR includes at least one logical channel group LCG, where the LCG includes at least one logical channel LCH;

the control instruction carries at least one LCG identifier and/or at least one LCH identifier; and the controlling, by the UE according to the control instruction, the to-be-controlled RB to transmit the BSR to the base station, includes:

acquiring, by the UE, the LCG identifier and/or the LCH identifier carried in the control instruction;

determining, by the UE, that an LCG and/or an LCH identified by the LCG identifier and/or LCH identifier are/is the LCG and/or LCH to be controlled by the control instruction; and controlling, by the UE according to the control instruction, the to-be-controlled RB to transmit the to-be-controlled LCG and/or LCH to the base station.

With reference to the first aspect or the first possible implementation manner of the first aspect, in a ninth possible implementation manner, the transmission control parameter carries a data type identifier; and before the applying, by the UE, the transmission control parameter to control data transmission when the UE needs to initiate data transmission to the base station, the method includes:

acquiring, by the UE, the data type identifier carried in the transmission control parameter; and determining, by the UE, that a data type identified by the data type identifier carried in the transmission control parameter is a data type to be controlled by the transmission control parameter.

A second aspect of the embodiments of the present invention provides a method for controlling data transmission, where the method may include:

transmitting, by a base station, at least one transmission control parameter to UE, so that the UE applies the transmission control parameter to control data transmission when the UE needs to initiate data transmission.

With reference to the second aspect, in a first possible implementation manner, the method further includes:

transmitting, by the base station, information to the UE, where the information carries the at least one transmission control parameter, and the information includes at least one of a system broadcast message, a paging message, an RRC message, or a MAC message.

With reference to the second aspect or the first possible implementation manner of the second aspect, in a second possible implementation manner, the transmission control parameter carries at least one RB identifier.

With reference to any one of the second aspect to the second possible implementation manner of the second aspect, in a third possible implementation manner, after the transmitting, by a base station, at least one transmission control parameter to UE, the method includes:

transmitting, by the base station, a command for enabling the transmission control parameter of a to-be-controlled RB to the UE.

With reference to the second aspect to the third possible implementation manner of the second aspect, in a fourth possible implementation manner, the data includes: a BSR; and the method further includes:

when the base station receives the BSR that the UE controls the to-be-controlled RB to transmit, returning, by the base station, a control instruction according to the BSR.

With reference to the fourth possible implementation manner of the second aspect, in a fifth possible implementation manner, the BSR includes at least one logical channel group LCG, where the LCG includes at least one logical channel LCH; and the control instruction carries at least one LCG identifier and/or at least one LCH identifier.

With reference to the fifth possible implementation manner of the second aspect, in a sixth possible implementation manner, the transmission control parameter carries a data type identifier.

A third aspect of the embodiments of the present invention provides a terminal device, where the terminal device may include:

a first receiving unit, configured to receive at least one transmission control parameter transmitted by a base station; and an application unit, configured to apply the transmission control parameter to control data transmission when the terminal device needs to initiate data transmission to the base station.

With reference to the third aspect, in a first possible implementation manner, the first receiving unit includes:

a first receiving subunit, configured to receive information transmitted by the base station, where the information includes at least one of a system broadcast message, a paging message, an RRC message, or a MAC message; and a parsing subunit, configured to parse the information to acquire the at least one transmission control parameter.

With reference to the third aspect or the first possible implementation manner of the third aspect, in a second possible implementation manner, the transmission control parameter carries a radio bearer RB identifier; and the terminal device includes:

a first acquiring unit, configured to acquire the RB identifier carried in the transmission control parameter; and a first determining unit, configured to determine that an RB identified by the RB identifier carried in the transmission control parameter is an RB to be controlled by the transmission control parameter.

With reference to the second possible implementation manner of the third aspect, in a third possible implementation manner, the terminal device further includes:

a second receiving unit, configured to receive a command, transmitted by the base station, for enabling the transmission control parameter of the to-be-controlled RB.

With reference to the second possible implementation manner of the third aspect or the third possible implementation manner of the third aspect, in a fourth possible implementation manner, the application unit includes:

an application subunit, configured to apply the transmission control parameter of the to-be-controlled RB to control the to-be-controlled RB to transmit the data to the base station.

With reference to any one of the third aspect to the third possible implementation manner of the third aspect, in a fifth possible implementation manner, the terminal device includes a determining unit, configured to determine whether the data meets a preset transmission condition, and when the data meets the preset transmission condition, notify the application unit to apply the transmission control parameter to control data transmission.

With reference to any one of the second possible implementation manner of the third aspect to the fifth possible implementation manner of the third aspect, in a sixth possible implementation manner, the application unit includes:

an allocation subunit, configured to randomly allocate a numeric value to the data according to the transmission control parameter;

a determining subunit, configured to determine whether the numeric value is less than a preset threshold; and a control subunit, configured to control, according to a determining result, the to-be-controlled RB to transmit the data.

With reference to any one of the second possible implementation manner of the third aspect to the sixth possible implementation manner of the third aspect, in a seventh possible implementation manner, the data includes a buffer status report data BSR; and the terminal device further includes:

a control unit, configured to: when the terminal device controls the to-be-controlled RB to transmit the BSR to the base station and receives a control instruction returned by the base station, control, according to the control instruction, the to-be-controlled RB to transmit the BSR to the base station.

With reference to the seventh possible implementation manner of the third aspect, in an eighth possible implementation manner, the BSR includes at least one logical channel group LCG, where the LCG includes at least one logical channel LCH;

the control instruction carries at least one LCG identifier and/or at least one LCH identifier; and the control unit includes:

an acquiring subunit, configured to acquire the LCG identifier and/or the LCH identifier carried in the control instruction;

a determining subunit, configured to determine that an LCG and/or an LCH identified by the LCG identifier and/or LCH identifier are/is the LCG and/or LCH to be controlled by the control instruction; and a control subunit, configured to control, according to the control instruction, the to-be-controlled RB to transmit the to-be-controlled LCG and/or LCH to the base station.

With reference to the third aspect or the first possible implementation manner of the third aspect, in a ninth possible implementation manner, the transmission control parameter carries a data type identifier; and the terminal device includes:

a second acquiring unit, configured to acquire the data type identifier carried in the transmission control parameter; and a second determining unit, configured to determine that a data type identified by the data type identifier carried in the transmission control parameter is a data type to be controlled by the transmission control parameter.

A fourth aspect of the embodiments of the present invention provides a base station, where the base station may include:

a first transmission unit, configured to transmit at least one transmission control parameter to a terminal device, so that the terminal device applies the transmission control parameter to control data transmission when the terminal device needs to initiate data transmission.

With reference to the fourth aspect, in a first possible implementation manner, the base station further includes:

a second transmission unit, configured to transmit information to the terminal device, where the information carries the at least one transmission control parameter, and the information includes at least one of a system broadcast message, a paging message, an RRC message, or a MAC message.

With reference to the fourth aspect to the first possible implementation manner of the fourth aspect, in a second possible implementation manner, the transmission control parameter carries at least one RB identifier.

With reference to the fourth aspect to the second possible implementation manner of the fourth aspect, in a third possible implementation manner, the base station includes:

a third transmission unit, configured to transmit a command for enabling the transmission control parameter of a to-be-controlled RB to the terminal device.

With reference to the fourth aspect to the third possible implementation manner of the fourth aspect, in a fourth possible implementation manner, the data includes: a BSR; and the base station further includes:

a fourth transmission unit, configured to return a control instruction according to the BSR when the base station receives the BSR that the UE controls the to-be-controlled RB to transmit.

With reference to the fourth possible implementation manner of the fourth aspect, in a fifth possible implementation manner, the BSR includes at least one logical channel group LCG, where the LCG includes at least one logical channel LCH; and the control instruction carries at least one LCG identifier and/or at least one LCH identifier.

With reference to the fifth possible implementation manner of the fourth aspect, in a sixth possible implementation manner, the transmission control parameter carries a data type identifier.

A fifth aspect of the embodiments of the present invention provides a computer storage medium, where the computer storage medium may store a program, where when executed, the program includes the steps according to any one of claims 1 to 6.

A sixth aspect of the embodiments of the present invention provides a terminal device, where the terminal device may include:

an input apparatus, an output apparatus, a memory, and a processor, where the memory stores a group of program code, and the processor is configured to invoke the program code stored in the memory to perform the following operations:

controlling the input apparatus to receive at least one transmission control parameter transmitted by a base station; and when data transmission needs to be initiated to the base station, applying the transmission control parameter to control data transmission.

With reference to the sixth aspect, in a first possible implementation manner, the controlling, by the processor, the input apparatus to receive at least one transmission control parameter transmitted by a base station, includes the following steps:

controlling the input apparatus to receive information transmitted by the base station, where the information includes at least one of a system broadcast message, a paging message, an RRC message, or a MAC message; and parsing the information to acquire the at least one transmission control parameter.

With reference to the sixth aspect or the first possible implementation manner of the sixth aspect, in a second possible implementation manner, the transmission control parameter carries a radio bearer RB identifier; and before the applying, by the processor, the transmission control parameter to control data transmission when data transmission needs to be initiated to the base station, the processor includes the following steps:

controlling the input apparatus to acquire the RB identifier carried in the transmission control parameter; and determining that an RB identified by the RB identifier carried in the transmission control parameter is an RB to be controlled by the transmission control parameter.

With reference to the second possible implementation manner of the sixth aspect, in a third possible implementation manner, before the applying, by the processor, the transmission control parameter to control data transmission when data transmission needs to be initiated to the base station, the processor further includes the following step:

controlling the input apparatus to receive a command, transmitted by the base station, for enabling the transmission control parameter of the to-be-controlled RB.

With reference to the second possible implementation manner of the sixth aspect or the third possible implementation manner of the sixth aspect, in a fourth possible implementation manner, the applying, by the processor, the transmission control parameter to control data transmission, includes the following step:

applying the transmission control parameter of the to-be-controlled RB to control the to-be-controlled RB to transmit the data to the base station.

With reference to any one of the sixth aspect to the third possible implementation manner of the sixth aspect, in a fifth possible implementation manner, before the applying, by the processor, the transmission control parameter to control data transmission when data transmission needs to be initiated to the base station, the processor includes the following steps:

determining whether the data meets a preset transmission condition; and if the data meets the preset transmission condition, performing the step of applying the transmission control parameter to control data transmission.

With reference to any one of the second possible implementation manner of the sixth aspect to the fifth possible implementation manner of the sixth aspect, in a sixth possible implementation manner, the applying, by the processor, the transmission control parameter to control data transmission, includes the following steps:

randomly allocating a numeric value to the data according to the transmission control parameter;

determining whether the numeric value is less than a preset threshold; and controlling, according to a determining result, the to-be-controlled RB to transmit the data.

With reference to any one of the second possible implementation manner of the sixth aspect to the sixth possible implementation manner of the sixth aspect, in a seventh possible implementation manner, the data includes a buffer status report data BSR; and the processor further performs the following step:

when controlling the to-be-controlled RB to transmit the BSR to the base station and controlling the input apparatus to receive a control instruction returned by the base station, controlling, according to the control instruction, the to-be-controlled RB to transmit the BSR to the base station.

With reference to the seventh possible implementation manner of the sixth aspect, in an eighth possible implementation manner, the BSR includes at least one logical channel group LCG, where the LCG includes at least one logical channel LCH;

the control instruction carries at least one LCG identifier and/or at least one LCH identifier; and the controlling, by the processor according to the control instruction, the to-be-controlled RB to transmit the BSR to the base station, includes the following steps:

controlling the input apparatus to acquire the LCG identifier and/or the LCH identifier carried in the control instruction;

determining that an LCG and/or an LCH identified by the LCG identifier and/or LCH identifier are/is the LCG and/or LCH to be controlled by the control instruction; and controlling, according to the control instruction, the to-be-controlled RB to transmit the to-be-controlled LCG and/or LCH to the base station.

With reference to the sixth aspect or the first possible implementation manner of the sixth aspect, in a ninth possible implementation manner, the transmission control parameter carries a data type identifier; and before the applying, by the processor, the transmission control parameter to control data transmission when data transmission needs to be initiated to the base station, the processor includes the following steps:

controlling the input apparatus to acquire the data type identifier carried in the transmission control parameter; and determining that a data type identified by the data type identifier carried in the transmission control parameter is a data type to be controlled by the transmission control parameter.

A seventh aspect of the embodiments of the present invention provides a base station, where the base station may include:

an input apparatus, an output apparatus, a memory, and a processor, where the memory stores a group of program code, and the processor is configured to invoke the program code stored in the memory to perform the following operations:

controlling the output apparatus to transmit at least one transmission control parameter to a terminal device, so that the terminal device applies the transmission control parameter to control data transmission when the terminal device needs to initiate data transmission.

With reference to the seventh aspect, in a first possible implementation manner, the processor is further configured to perform the following operation:

controlling the output apparatus to transmit information to the terminal device, where the information carries the at least one transmission control parameter, and the information includes at least one of a system broadcast message, a paging message, an RRC message, or a MAC message.

With reference to the seventh aspect or the first possible implementation manner of the seventh aspect, in a second possible implementation manner, the transmission control parameter carries at least one RB identifier.

With reference to any one of the seventh aspect to the second possible implementation manner of the seventh aspect, in a third possible implementation manner, after the controlling, by the processor, the output apparatus to transmit at least one transmission control parameter to the terminal device, the processor includes the following step:

controlling the output apparatus to transmit a command for enabling the transmission control parameter of a to-be-controlled RB to the terminal device.

With reference to any one of the seventh aspect to the third possible implementation manner of the seventh aspect, in a fourth possible implementation manner, the data includes: a BSR; and the processor is further configured to perform the following operation:

when the input apparatus receives the BSR that the terminal device controls the to-be-controlled RB to transmit, controlling the output apparatus to return a control instruction according to the BSR.

With reference to the fourth possible implementation manner of the seventh aspect, in a fifth possible implementation manner, the BSR includes at least one logical channel group LCG, where the LCG includes at least one logical channel LCH; and the control instruction carries at least one LCG identifier and/or at least one LCH identifier.

With reference to the fifth possible implementation manner of the seventh aspect, in a sixth possible implementation manner, the transmission control parameter carries a data type identifier.

An eighth aspect of the embodiments of the present invention provides a system or controlling data transmission, where the system may include the terminal device provided by the sixth aspect of the embodiments of the present invention and the base station provided by the seventh aspect of the embodiments of the present invention.

As can be seen from above, in some feasible embodiments of the present invention, a base station configures a transmission parameter for UE, so that when initiating data transmission, the UE may apply the transmission control parameter configured by the base station to control data transmission. In the present invention, in a case of network congestion, utilization of network resources is improved effectively, flexibility of data transmission of the UE side can be improved, and a user experience effect is improved effectively.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 7 is a flowchart of still another embodiment of a method for controlling data transmission according to the present invention;

FIG. 8 is a flowchart of still another embodiment of a method for controlling data transmission according to the present invention;

FIG. 9 is a flowchart of still another embodiment of a method for controlling data transmission according to the present invention;

FIG. 10 is a structural diagram of an embodiment of a terminal device according to the present invention;

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
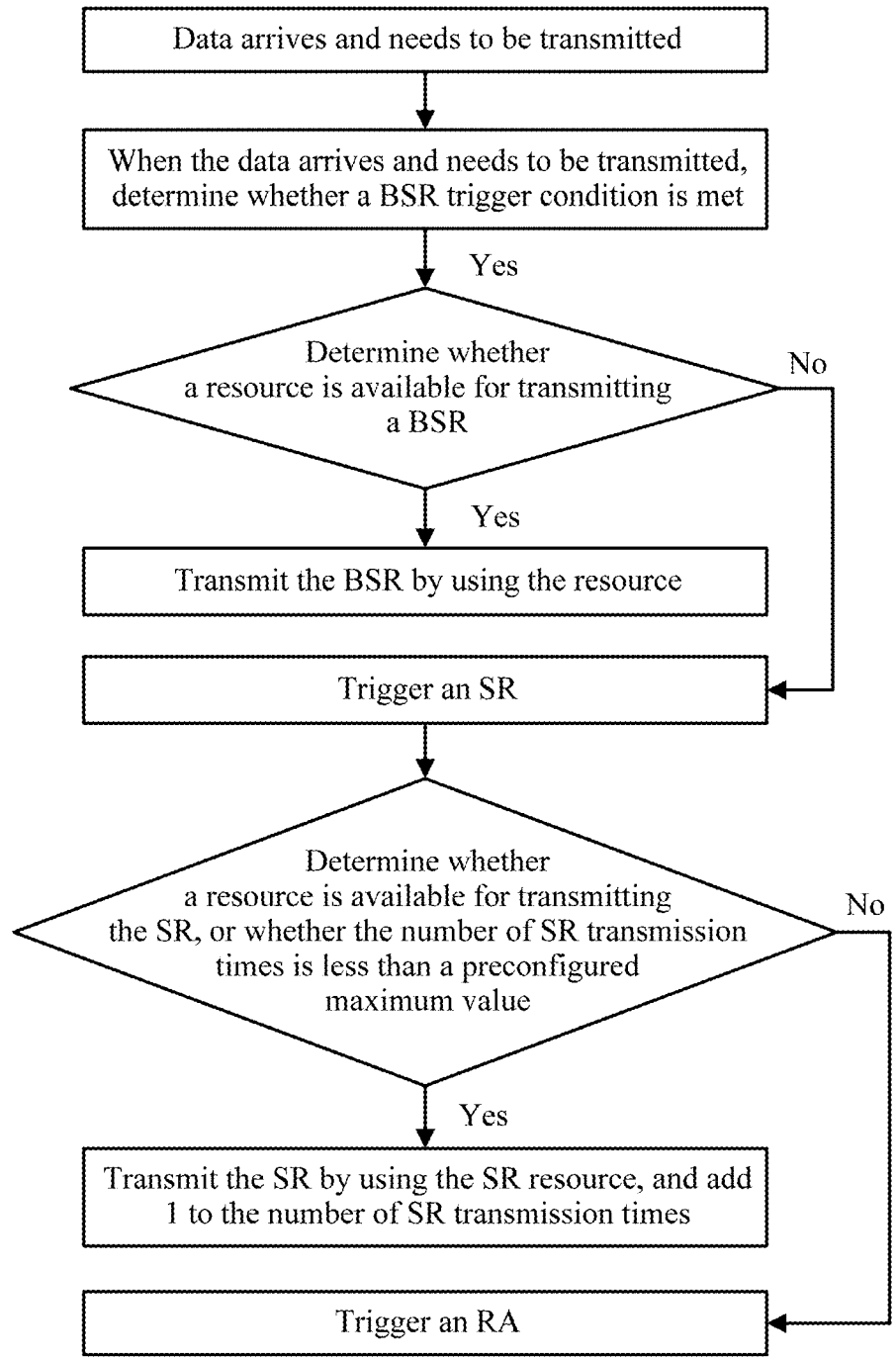
FIG. 1 is a flowchart of an embodiment of a resource scheduling mechanism in an LTE system involved in the present invention.

Referring to FIG. 1, FIG. 1 is a flowchart of an embodiment of a resource scheduling mechanism in an LTE (Long Term Evolution) system involved in an LTE technology according to the present invention. As shown in FIG. 1, in this embodiment, the resource scheduling mechanism in the LTE system is described in detail.

In the prior art of the present invention, the LTE system is one of long-term evolution technologies for 3G (3rd-generation, third generation mobile communications technologies). The LTE system can provide high-speed uplink and downlink data transmission. To ensure effective transmission of uplink data, an uplink resource for transmitting uplink data may be acquired from a base station side by using an effective resource request mechanism. The resource request mechanism in the LTE system may be in the following two manners. In one manner, after a BSR (Buffer Status Report) is triggered, if a PUSCH (Physical Uplink Shared Channel) resource is available, the BSR, that is, an uplink data buffer size, is reported directly. In the other manner, after a BSR is triggered, if no PUSCH resource is available, that is, in a case in which an uplink data buffer size cannot be reported, a scheduling request SR (Scheduling Request) is triggered, and a PUSCH resource for transmitting data or reporting the uplink data buffer size is requested by using the SR. The LTE system may effectively ensure high-speed data transmission of UE (User Equipment) by using the two resource request mutual coordination manners. The resource request mechanism in LTE uses a radio bearer RB (Radio Bearer) to transmit an uplink BSR or SR.

Further, in a BSR process, a main function of a BSR is to report a data size in an uplink data buffer of the UE to the base station, so that the UE can acquire an uplink resource from the base station to transmit data in the buffer. When a condition in the following conditions is met, a BSR may be triggered: 1. A regular BSR is triggered when a logical channel with a higher priority has transmittable data. 2. A BSR is triggered when data increases from zero (that is, all logical channels previously do not have transmittable data, and then a certain logical channel has transmittable data).

Further, after the BSR is triggered, if no resource for transmitting the BSR is available, an SR process, namely, a scheduling request process, is triggered immediately. After the UE triggers an SR, the UE transmits the SR to the base station by using a PUCCH in an uplink subframe in which a PUCCH resource for SR transmission is configured, and starts an SR transmission prohibit timer based on the configuration. An uplink subframe in which a PUCCH resource for SR transmission is configured occurs periodically, and a length of the timer is an integer multiple of an SR period, where the specific multiple may be configured. After expiry of the timer and before a next uplink subframe in which a PUCCH resource for SR transmission is configured, if the UE does not obtain a PUSCH resource for BSR transmission, the UE retransmits the SR, and restarts the timer, and the UE adds 1 to a quantity of SR transmission times, and records the quantity of SR transmission times. If the quantity of times that the UE transmits the SR is greater than a preconfigured maximum value, the UE triggers a random access RA (Random Access) process. If the UE obtains a PUSCH resource and transmits the BSR, the UE cancels the triggered BSR and SR.

Referring to FIG. 1, we can understand from above that, if a BSR is triggered (which indicates that the UE has data to transmit), and the UE has an uplink resource for transmitting the BSR, the UE reports the BSR. If the UE does not have an uplink resource for transmitting the BSR, an SR process is triggered. In the SR process, when a quantity of SR transmission times is greater than a preconfigured maximum value, if the UE still cannot acquire an uplink resource and transmit the BSR, a random access RA process is triggered.

We can know from above that the described BSR may be a regular BSR, where the BSR may further include a regular BSR and a padding BSR.

Figure 2:
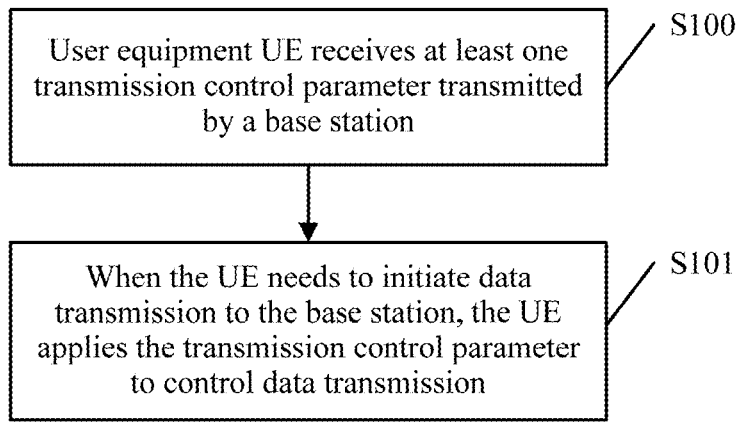
FIG. 2 is a flowchart of an embodiment of a method for controlling data transmission according to the present invention.

Referring to FIG. 2, FIG. 2 is a flowchart of an embodiment of a method for controlling data transmission according to the present invention. The following describes, from a UE side, a method for controlling data transmission, where the UE may include a mobile phone terminal. As shown in FIG. 1, the method for controlling data transmission in this embodiment may include the following steps:

S100. User equipment UE receives at least one transmission control parameter transmitted by a base station.

Specifically, in this embodiment, the UE in RRC (Radio Resource Control, Radio Resource Control protocol) connected mode receives the at least one transmission control parameter transmitted by the base station. The control parameter may carry at least one UE identifier. The control parameter may further carry at least one RB identifier.

We can understand from above that when the UE receives the transmission control parameter transmitted by the base station, the UE acquires the UE identifier carried in the transmission control parameter, and that the UE determines whether the UE identifier matches the UE. Further, when the UE determines that the UE identifier carried in the transmission control parameter matches the UE, the UE receives the transmission control parameter transmitted by the base station. When the UE determines that the UE identifier carried in the transmission control parameter does not match the UE, the UE refuses to receive the transmission control parameter transmitted by the base station. A plurality of UEs may receive a same transmission control parameter, and in this case, the transmission control parameter carries a plurality of UE identifiers. In the embodiment of the present invention, the transmission control parameter may be notified to the UE by using a system broadcast message or a dedicated RRC message, or is fixed in a protocol, which is not limited herein.

Further, the UE may acquire the RB identifier in the transmission control parameter, so that the UE configures the transmission control parameter for an RB or a group of RBs according to the RB identifier in the transmission control parameter. The RB identifier may be an ID (Identifier) of an RB, and the UE confirms a to-be-controlled RB according to the ID; or the RB identifier may be an ID of an RB group, and the UE confirms a group of to-be-controlled RBs according to the ID of the RB group, that is, a same transmission control parameter may be configured for a plurality of RBs. In addition, a plurality of different transmission control parameters may be configured for one RB. Further, the RB identifier may be an LCH (Logical Channel Identifier, logical channel) ID, and the UE confirms, according to the LCH ID, a to-be-controlled RB including the LCH ID; or the RB identifier may be an LCG (Logical Channel Group) ID, and the UE confirms, according to the LCG ID, a to-be-controlled RB including the LCG ID; or the RB identifier may be a QCI (QoS (Quality of Service) Class Identifier, class identifier), and the UE confirms a to-be-controlled RB according to the QCI.

Further, the transmission control parameter may further carry a data type identifier, and the UE identifies to-be-controlled data by acquiring the data type identifier in the transmission control parameter, and configures the transmission control parameter for to-be-controlled data of an identified data type. Specifically, for example, the data type identifier may include a BSR trigger type, a BSR transmission type, an SR trigger type, and an SR transmission type, where the data type identifier may include one or more data types. When the data type identifier carried in the transmission control parameter is a BSR trigger type identifier, the UE identifies the BSR trigger identifier and acquires that the data to be controlled by the transmission control parameter is BSR trigger data, that is, when the UE triggers a BSR, the UE may control a BSR trigger process of the UE according to the transmission control parameter. When the data type identifier carried in the transmission control parameter is a BSR transmission type identifier, the UE identifies the BSR transmission type identifier and acquires that the transmission control parameter is BSR transmission data, that is, when the UE transmits a BSR, the UE may control a BSR transmission process according to the transmission control parameter carrying the BSR transmission type identifier. Likewise, identification and control processes of the transmission control parameter carrying an SR trigger type identifier or an SR transmission type identifier are the same as above and are not repeated herein.

S101. When the UE needs to initiate data transmission to the base station, the UE applies the transmission control parameter to control data transmission.

Specifically, in this embodiment, reference may be made to the description of the embodiment of the resource scheduling mechanism in the LTE system. When the UE needs to initiate data transmission to the base station, the UE triggers a BSR, and performs a series of resource request and scheduling processes. In the resource request and scheduling processes, the UE applies a transmission control parameter of an RB to control the resource request and scheduling of the RB, and thereby controls the RB to transmit data to the base station. Controlling data transmission may be controlling immediate transmission or immediate triggering, deferred transmission or deferred triggering, or prohibited transmission or prohibited triggering of data. For example, when a BSR trigger condition of the UE is met, the UE applies the transmission control parameter of the RB to control the RB to defer triggering a BSR for a predetermined time when a signal indicating that the BSR trigger condition is met is received, where the transmission control parameter includes a parameter instruction for controlling deferred triggering of the BSR. Further, when the BSR trigger condition of the UE is met, and an uplink resource is available for transmitting the BSR, the UE may apply the transmission control parameter of the RB to control the RB to prohibit transmitting the BSR when a signal indicating that an uplink resource is available for transmission is received. Likewise, the UE may apply the transmission control parameter of the RB to control the RB to defer triggering a BSR or an SR or an RA for a predetermined time when a BSR or SR or RA trigger condition is met (or not met). Alternatively, the UE may apply the transmission control parameter of the RB to control the RB to transmit a BSR or an SR or an RA or data immediately when a BSR or SR or RA or data transmission condition is met (or not met). Alternatively, the UE may apply the transmission control parameter of the RB to control the RB to prohibit transmitting an SR or an RA or data when a BSR or SR or RA or data transmission condition is met (or not met). Further, a deferral timer may be included for deferring transmitting the BSR or SR or RA or data. When the time during which the BSR or SR or RA or data is deferred under control of the UE exceeds the deferral timer, the UE transmits the BSR or SR or RA or data. A length of the deferral timer may be configured in the transmission control parameter by the base station, or may be obtained according to a certain rule and based on a length configured in the transmission control parameter. For example, the length of the timer is a randomly generated value from 0 to the length configured in the transmission control parameter. The specific rule is not limited herein.

We can understand from above that the transmission control parameter may control the resource request and scheduling of the UE. When the UE is in a case of network congestion, if data of a certain RB or certain RBs meets the BSR trigger condition, the UE may defer or prohibit triggering a BSR for the data of the certain RB or certain RBs by using the transmission control parameter, to ensure that data of other RBs or UEs is transmitted effectively. If a BSR is triggered, and the UE has an uplink resource for transmitting the BSR, the UE may control deferred transmission of the BSR by using the transmission control parameter, to ensure that data of other RBs or UEs is transmitted effectively. If the UE does not have an uplink resource for transmitting the BSR and needs to trigger an SR, the UE may control deferred triggering or deferred transmission of the SR or the like by using the transmission control parameter, to ensure that data of other RBs or UEs is transmitted effectively. The transmission parameter carries different control parameter instructions according to control requirements of the base station. Further, the UE may control data transmission according to an instruction of the base station, so that an objective of controlling the UE to transmit important data and barring the UE from transmitting data that is temporarily unimportant is achieved in a case of network congestion. This effectively improves utilization of network resources and improves user experience.

Further, specific information carried in the transmission control parameter may further achieve the following control objective. When the transmission control parameter is applied by the UE, the transmission control parameter controls the UE to randomly allocate a numeric value to the data, and the transmission control parameter controls the UE to generate a threshold (or the transmission control parameter carries a threshold). Further, the UE determines whether the numeric value randomly allocated to the data is less than a preset threshold, so that the UE controls, according to a determining result, the RB to transmit the data. In an actual application, for example, that the UE controls, according to a determining result, the RB to transmit the data, may be: in the data transmission process, when the numeric value randomly allocated to the data is less than or equal to the preset threshold, the UE may control the RB to defer transmitting the data, and when the numeric value randomly allocated to the data is greater than the preset threshold, the UE may control the RB to prohibit transmitting the data. Likewise, in a transmission process for triggering a BSR, when a numeric value randomly allocated to the BSR is less than or equal to a preset threshold, the UE may control the RB to defer triggering the BSR when the BSR trigger condition is met, and when the numeric value randomly allocated to the BSR is greater than the preset threshold, the UE may control the RB to immediately trigger the BSR when the BSR trigger condition is met, where deferring triggering the BSR may be triggering the BSR after a deferral timer time expires. In a transmission process for transmitting a BSR, when a numeric value randomly allocated to the BSR is less than or equal to a preset threshold, the UE may control the RB to prohibit transmitting the BSR when a BSR transmission condition is met, and when the numeric value randomly allocated to the BSR is greater than the preset threshold, the UE may control the RB to immediately transmit the BSR when the BSR transmission condition is met. In a process for triggering an SR, when a numeric value randomly allocated to the SR is less than or equal to a preset threshold, the UE may control the RB to prohibit triggering the SR when an SR transmission condition is met, and when the numeric value randomly allocated to the SR is greater than the preset threshold, the UE may control the RB to immediately trigger the SR when the SR transmission condition is met. In a process for transmitting an SR, when a numeric value randomly allocated to the SR is less than or equal to a preset threshold, the UE may control the RB to prohibit transmitting the SR when an SR transmission condition is met, and when the numeric value randomly allocated to the SR is greater than the preset threshold, the UE may control the RB to immediately transmit the SR when the SR transmission condition is met. In a process for triggering an RA, when a numeric value randomly allocated to the RA is less than or equal to a preset threshold, the UE may control the RB to prohibit triggering the RA when an RA transmission condition is met, and when the numeric value randomly allocated to the RA is greater than the preset threshold, the UE may control the RB to immediately trigger the RA when the RA transmission condition is met. In a process for transmitting an RA, when a numeric value randomly allocated to the RA is less than or equal to a preset threshold, the UE may control the RB to prohibit transmitting the RA when an RA transmission condition is met, and when the numeric value randomly allocated to the RA is greater than the preset threshold, the UE may control the RB to immediately transmit the RA when the RA transmission condition is met. A transmission mode in which the RB is controlled according to the determining result to transmit the data is not limited to the embodiment described above. The transmission mode may be changed according to an instruction carried in a specific transmission control instruction.

Further, when the UE needs to initiate data transmission to the base station, the UE may further apply the transmission control parameter matching the data type, to control transmission of data of the corresponding data type. For the process in which the UE applies the transmission control parameter matching the data type, to control transmission of data of the corresponding data type, reference may be made to the foregoing description, and details are not repeated herein.

Figure 3:
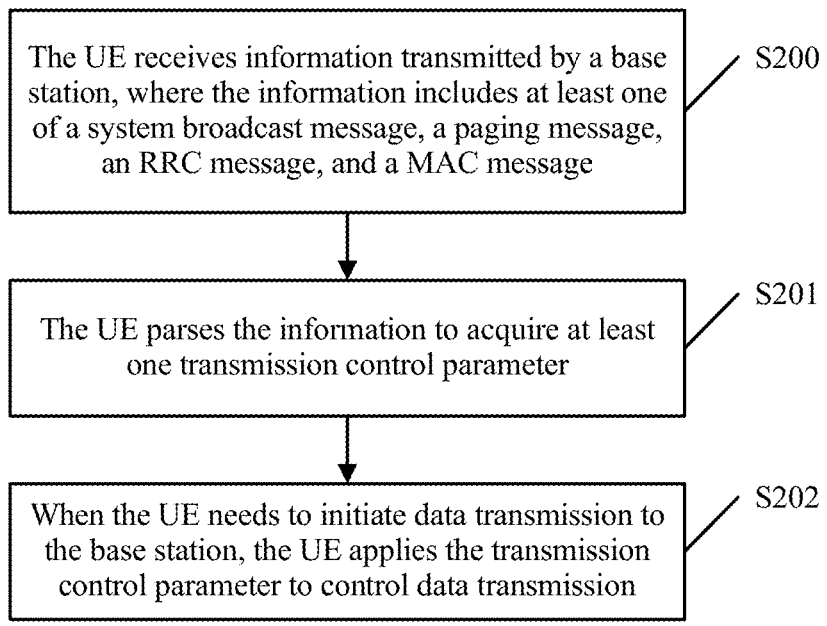
FIG. 3 is a flowchart of another embodiment of a method for controlling data transmission according to the present invention.

Referring to FIG. 3, FIG. 3 is a flowchart of another embodiment of a method for controlling data transmission according to the present invention. As shown in FIG. 3, the method for controlling data transmission in this embodiment may include the following steps:

S200. The UE receives information transmitted by a base station, where the information includes at least one of a system broadcast message, a paging message, an RRC message, or a MAC message.

Specifically, in this embodiment, when the UE receives the information transmitted by the base station, the information may carry a transmission control parameter. The information may be at least one of the system broadcast message, paging message, RRC message, and MAC message transmitted by the base station. The base station configures the transmission control parameter for an RB of the UE by using the information in the at least one of the system broadcast message, paging message, RRC message, and MAC message.

S201. The UE parses the information to acquire at least one transmission control parameter.

Specifically, in this embodiment, the UE parses the information in the at least one of the system broadcast message, paging message, RRC message, and MAC message transmitted by the base station, to obtain the transmission control parameter. The UE includes at least one RB, and the control parameter may carry at least one RB identifier, where the RB identifier may identify a to-be-controlled RB. Alternatively, the control parameter may carry a data type identifier, where the data type identifier may identify to-be-controlled data.

In the embodiment of the present invention, when the UE acquires the at least one transmission control parameter by parsing the information, the UE may acquire the RB identifier in the transmission control parameter, so that the UE determines, according to an RB identified by the RB identifier in the transmission control parameter, that an RB or a group of RBs is an RB to be controlled by the transmission control parameter. The RB identifier may be an ID of an RB, and the UE confirms a to-be-controlled RB according to the ID; or the RB identifier may be an ID of an RB group, and the UE confirms a group of to-be-controlled RBs according to the ID of the RB group, that is, a same transmission control parameter may be configured for a plurality of RBs. In addition, a plurality of different transmission control parameters may be configured for one RB. Further, the RB identifier may be an LCH ID, and the UE confirms, according to the LCH ID, a to-be-controlled RB including the LCH ID; or the RB identifier may be an LCG ID, and the UE confirms, according to the LCG ID, a to-be-controlled RB including the LCG ID; or the RB identifier may be a QCI, and the UE confirms a to-be-controlled RB according to the QCI.

Further, the transmission control parameter may further carry a data type identifier, and the UE identifies to-be-controlled data by acquiring the data type identifier in the transmission control parameter, and configures the transmission control parameter for to-be-controlled data of an identified data type. Specifically, for example, the data type identifier may include a BSR trigger type, a BSR transmission type, an SR trigger type, and an SR transmission type, where the data type identifier may include one or more data types. When the data type identifier carried in the transmission control parameter is a BSR trigger type identifier, the UE identifies the BSR trigger identifier and acquires that the data to be controlled by the transmission control parameter is BSR trigger data, that is, when the UE triggers a BSR, the UE may control a BSR trigger process of the UE according to the transmission control parameter. When the data type identifier carried in the transmission control parameter is a BSR transmission type identifier, the UE identifies the BSR transmission type identifier and acquires that the transmission control parameter is BSR transmission data, that is, when the UE transmits a BSR, the UE may control a BSR transmission process according to the transmission control parameter carrying the BSR transmission type identifier. Likewise, identification and control processes of the transmission control parameter carrying an SR trigger type identifier or an SR transmission type identifier are the same as above and are not repeated herein.

S202. When the UE needs to initiate data transmission to the base station, the UE applies the transmission control parameter to control data transmission.

Specifically, in this embodiment, reference may be made to the description of the embodiment of the resource scheduling mechanism in the LTE system. When the UE needs to initiate data transmission to the base station, the UE triggers a BSR, and performs a series of resource request and scheduling processes. In the resource request and scheduling processes, the UE applies a transmission control parameter of an RB to control the resource request and scheduling of the RB, and thereby controls the RB to transmit data to the base station, where controlling data transmission may be controlling immediate transmission or immediate triggering, deferred transmission or deferred triggering, or prohibited transmission or prohibited triggering of data. For example, when a BSR trigger condition of the UE is met, the UE applies the transmission control parameter of the RB to control the RB to defer triggering a BSR for a predetermined time when a signal indicating that the BSR trigger condition is met is received, where the transmission control parameter includes a parameter instruction for controlling deferred triggering of the BSR. Further, when the BSR trigger condition of the UE is met, and an uplink resource is available for transmitting the BSR, the UE may apply the transmission control parameter of the RB to control the RB to prohibit transmitting the BSR when a signal indicating that an uplink resource is available for transmission is received. Likewise, the UE may apply the transmission control parameter of the RB to control the RB to defer triggering a BSR or an SR or an RA for a predetermined time when a BSR or SR or RA trigger condition is met (or not met); or the UE may apply the transmission control parameter of the RB to control the RB to transmit a BSR or an SR or an RA or data immediately when a BSR or SR or RA or data transmission condition is met (or not met); or the UE may apply the transmission control parameter of the RB to control the RB to prohibit transmitting an SR or an RA or data when a BSR or SR or RA or data transmission condition is met (or not met). Further, a deferral timer may be included for deferring transmitting the BSR or SR or RA or data. When the time during which the BSR or SR or RA or data is deferred under control of the UE exceeds the deferral timer, the UE transmits the BSR or SR or RA or data. A length of the deferral timer may be configured in the transmission control parameter by the base station, or may be obtained according to a certain rule and based on a length configured in the transmission control parameter. For example, the length of the timer is a randomly generated value from 0 to the length configured in the transmission control parameter. The specific rule is not limited herein.

We can understand from above that the transmission control parameter may control the resource request and scheduling of the UE. When the UE is in a case of network congestion, if data of a certain RB or certain RBs meets the BSR trigger condition, the UE may defer or prohibit triggering a BSR for the data of the certain RB or certain RBs by using the transmission control parameter, to ensure that data of other RBs or UEs is transmitted effectively. If a BSR is triggered, and the UE has an uplink resource for transmitting the BSR, the UE may use the transmission control parameter of the RB to control the RB to defer transmission of the BSR, to ensure that data of other RBs or UEs is transmitted effectively. If the UE does not have an uplink resource for transmitting the BSR, the UE may use the transmission control parameter of the RB to control the RB to defer triggering of an SR, or defer transmission, or defer transmission, or the like, to ensure that data of other RBs or UEs is transmitted effectively. The transmission parameter carries different control parameter instructions according to control requirements of the base station. Further, the UE may control data transmission according to an instruction of the base station, so that an objective of controlling the UE to transmit important data and barring the UE from transmitting data that is temporarily unimportant is achieved in a case of network congestion. This effectively improves utilization of network resources and improves user experience.

Further, specific information carried in the transmission control parameter may further achieve the following control objective. When the transmission control parameter is applied by the UE, the transmission control parameter controls the UE to randomly allocate a numeric value to the data, and the transmission control parameter controls the UE to generate a threshold (or the transmission control parameter carries a threshold). Further, the UE determines whether the numeric value randomly allocated to the data is less than a preset threshold, so that the UE controls, according to a determining result, the RB to transmit the data. In an actual application, for example, that the UE controls, according to a determining result, the RB to transmit the data, may be: in the data transmission process, when the numeric value randomly allocated to the data is less than or equal to the preset threshold, the UE may control the RB to defer transmitting the data, and when the numeric value randomly allocated to the data is greater than the preset threshold, the UE may control the RB to prohibit transmitting the data. Likewise, in a transmission process for triggering a BSR, when a numeric value randomly allocated to the BSR is less than or equal to a preset threshold, the UE may control the RB to defer triggering the BSR when the BSR trigger condition is met, and when the numeric value randomly allocated to the BSR is greater than the preset threshold, the UE may control the RB to immediately trigger the BSR when the BSR trigger condition is met, where deferring triggering the BSR may be triggering the BSR after a deferral timer time expires. In a transmission process for transmitting a BSR, when a numeric value randomly allocated to the BSR is less than or equal to a preset threshold, the UE may control the RB to prohibit transmitting the BSR when a BSR transmission condition is met, and when the numeric value randomly allocated to the BSR is greater than the preset threshold, the UE may control the RB to immediately transmit the BSR when the BSR transmission condition is met. In a process for triggering an SR, when a numeric value randomly allocated to the SR is less than or equal to a preset threshold, the UE may control the RB to prohibit triggering the SR when an SR transmission condition is met, and when the numeric value randomly allocated to the SR is greater than the preset threshold, the UE may control the RB to immediately trigger the SR when the SR transmission condition is met. In a process for transmitting an SR, when a numeric value randomly allocated to the SR is less than or equal to a preset threshold, the UE may control the RB to prohibit transmitting the SR when an SR transmission condition is met, and when the numeric value randomly allocated to the SR is greater than the preset threshold, the UE may control the RB to immediately transmit the SR when the SR transmission condition is met. In a process for triggering an RA, when a numeric value randomly allocated to the RA is less than or equal to a preset threshold, the UE may control the RB to prohibit triggering the RA when an RA transmission condition is met, and when the numeric value randomly allocated to the RA is greater than the preset threshold, the UE may control the RB to immediately trigger the RA when the RA transmission condition is met. In a process for transmitting an RA, when a numeric value randomly allocated to the RA is less than or equal to a preset threshold, the UE may control the RB to prohibit transmitting the RA when an RA transmission condition is met, and when the numeric value randomly allocated to the RA is greater than the preset threshold, the UE may control the RB to immediately transmit the RA when the RA transmission condition is met. A transmission mode in which the RB is controlled according to the determining result to transmit the data is not limited to the embodiment described above. The transmission mode may be changed according to an instruction carried in a specific transmission control instruction.

Figure 4:
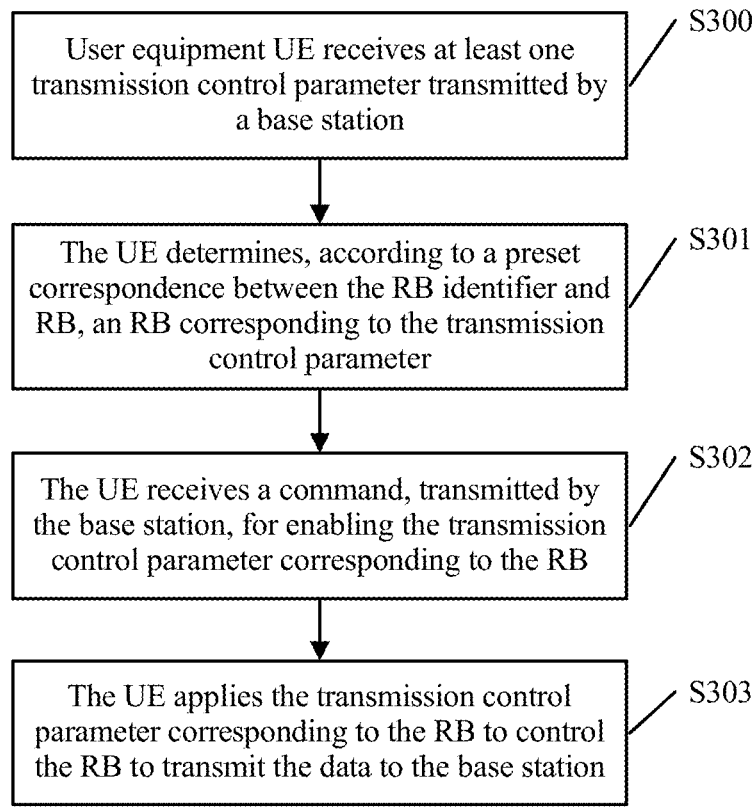
FIG. 4 is a flowchart of still another embodiment of a method for controlling data transmission according to the present invention.

Referring to FIG. 4, FIG. 4 is a flowchart of still another embodiment of a method for controlling data transmission according to the present invention. As shown in FIG. 4, the method for controlling data transmission in this embodiment may include the following steps:

S300. User equipment UE receives at least one transmission control parameter transmitted by a base station.

Specifically, in this embodiment, the UE in RRC (Radio Resource Control, Radio Resource Control protocol) connected mode receives the at least one transmission control parameter transmitted by the base station. The transmission control parameter includes an instruction for controlling a data transmission form, for example, an instruction for transmitting data immediately, an instruction for transmitting data regularly, an instruction for prohibiting transmitting data, and an instruction for deferring transmitting data. Further, the control parameter may carry at least one UE identifier, and a correspondence between UE and UE identifier is preset in the UE. Further, the UE includes at least one RB, and the control parameter may carry at least one RB identifier.

In the embodiment of the present invention, when the UE receives the transmission control parameter transmitted by the base station, the UE acquires the UE identifier carried in the transmission control parameter, and determines whether the UE identifier matches the UE. Further, when the UE determines that the UE identifier carried in the transmission control parameter matches the UE, the UE receives the transmission control parameter transmitted by the base station; when the UE determines that the UE identifier carried in the transmission control parameter does not match the UE, the UE refuses to receive the transmission control parameter transmitted by the base station. A plurality of UEs may receive a same transmission control parameter, and in this case, the transmission control parameter carries a plurality of UE identifiers.

S301. The UE acquires an RB identifier carried in the transmission control parameter.

In the embodiment of the present invention, the UE may acquire the RB identifier carried in the transmission control parameter. The RB identifier may be an ID of an RB, and the UE confirms a to-be-controlled RB according to the ID; or the RB identifier may be an ID of an RB group, and the UE confirms a group of to-be-controlled RBs according to the ID of the RB group, that is, a same transmission control parameter may be configured for a plurality of RBs. In addition, a plurality of different transmission control parameters may be configured for one RB. Further, the RB identifier may be an LCH ID, and the UE confirms, according to the LCH ID, a to-be-controlled RB including the LCH ID; or the RB identifier may be an LCG ID, and the UE confirms, according to the LCG ID, a to-be-controlled RB including the LCG ID; or the RB identifier may be a QCI, and the UE confirms a to-be-controlled RB according to the QCI.

S302. The UE determines that an RB identified by the RB identifier carried in the transmission control parameter is an RB to be controlled by the transmission control parameter.

In the embodiment of the present invention, the UE may determine, according to the RB identifier in the transmission control parameter, that the identified RB is the RB to be controlled by the transmission control parameter, where the to-be-controlled RB may be an RB or a group of RBs. The UE makes confirmation according to the RB identifier carried in the transmission control parameter.

S303. The UE receives a command, transmitted by the base station, for enabling the transmission control parameter of the to-be-controlled RB.

Specifically, in this embodiment, when receiving the transmission control parameter configured by the base station, the UE may not apply the transmission control parameter immediately first. When receiving the command, transmitted by the base station, for enabling the transmission control parameter of the to-be-controlled RB, the UE applies the transmission control parameter to control data transmission. The enable command may be an explicit command, or may be implicit system overload information, which is not limited herein.

Further, when congestion occurs in the base station, or the base station transmits congestion level information to the terminal, the UE may apply the transmission control parameter according to a congestion level, and in this case, different congestion levels may correspond to different transmission control parameters.

We can understand from above that, in the embodiment of the present invention, the base station transmits the enable command or notification information to instruct the UE to enable the transmission control parameter to control data transmission, which improves flexibility of controlling data transmission by the UE.

S304. The UE applies the transmission control parameter of the to-be-controlled RB to control the to-be-controlled RB to transmit the data to the base station.

Specifically, in this embodiment, reference may be made to the description of the embodiment of the resource scheduling mechanism in the LTE system. When the UE needs to initiate data transmission to the base station, the UE triggers a BSR, and performs a series of resource request and scheduling processes. In the resource request and scheduling processes, the UE applies a transmission control parameter of an RB to control the resource request and scheduling of the RB, and thereby controls the RB to transmit data to the base station, where controlling data transmission may be controlling immediate transmission or immediate triggering, deferred transmission or deferred triggering, or prohibited transmission or prohibited triggering of data. For example, when a BSR trigger condition of the UE is met, the UE applies the transmission control parameter of the RB to control the RB to defer triggering a BSR for a predetermined time when a signal indicating that the BSR trigger condition is met is received, where the transmission control parameter includes a parameter instruction for controlling deferred triggering of the BSR. Further, when the BSR trigger condition of the UE is met, and an uplink resource is available for transmitting the BSR, the UE may apply the transmission control parameter of the RB to control the RB to prohibit transmitting the BSR when a signal indicating that an uplink resource is available for transmission is received. Likewise, the UE may apply the transmission control parameter of the RB to control the RB to defer triggering a BSR or an SR or an RA for a predetermined time when a BSR or SR or RA trigger condition is met (or not met); or the UE may apply the transmission control parameter of the RB to control the RB to transmit a BSR or an SR or an RA or data immediately when a BSR or SR or RA or data transmission condition is met (or not met); or the UE may apply the transmission control parameter of the RB to control the RB to prohibit transmitting an SR or an RA or data when a BSR or SR or RA or data transmission condition is met (or not met). Further, a deferral timer may be included for deferring transmitting the BSR or SR or RA or data. When the time during which the BSR or SR or RA or data is deferred under control of the UE exceeds the deferral timer, the UE transmits the BSR or SR or RA or data. A length of the deferral timer may be configured in the transmission control parameter by the base station, or may be obtained according to a certain rule and based on a length configured in the transmission control parameter. For example, the length of the timer is a randomly generated value from 0 to the length configured in the transmission control parameter. The specific rule is not limited herein.

We can understand from above that the transmission control parameter may control the resource request and scheduling of the UE. When the UE is in a case of network congestion, if a certain RB or certain RBs meet the BSR trigger condition, the UE may defer or prohibit triggering a BSR for the certain RB or certain RBs by using the transmission control parameter, to ensure that data of other RBs or UEs is transmitted effectively. If a BSR is triggered, and the UE has an uplink resource for transmitting the BSR, the UE may control deferred transmission of the BSR by using the transmission control parameter, to ensure that data of other RBs or UEs is transmitted effectively. If the UE does not have an uplink resource for transmitting the BSR, the UE may control deferred triggering or deferred transmission of an SR or the like by using the transmission control parameter, to ensure that data of other RBs or UEs is transmitted effectively. The transmission parameter carries different control parameter instructions according to control requirements of the base station. Further, the UE may control data transmission according to an instruction of the base station, so that an objective of controlling the UE to transmit important data and barring the UE from transmitting data that is temporarily unimportant is achieved in a case of network congestion. This effectively improves utilization of network resources and improves user experience.

Further, specific information carried in the transmission control parameter may further achieve the following control objective. When the transmission control parameter is applied by the UE, the transmission control parameter controls the UE to randomly allocate a numeric value to the data, and the transmission control parameter controls the UE to generate a threshold (or the transmission control parameter carries a threshold). Further, the UE determines whether the numeric value randomly allocated to the data is less than a preset threshold, so that the UE controls, according to a determining result, the to-be-controlled RB to transmit the data. In an actual application, for example, that the UE controls, according to a determining result, the to-be-controlled RB to transmit the data, may be: in the data transmission process, when the numeric value randomly allocated to the data is less than or equal to the preset threshold, the UE may control the RB to defer transmitting the data, and when the numeric value randomly allocated to the data is greater than the preset threshold, the UE may control the to-be-controlled RB to prohibit transmitting the data. Likewise, in a transmission process for triggering a BSR, when a numeric value randomly allocated to the BSR is less than or equal to a preset threshold, the UE may control the to-be-controlled RB to defer triggering the BSR when the BSR trigger condition is met, and when the numeric value randomly allocated to the BSR is greater than the preset threshold, the UE may control the to-be-controlled RB to immediately trigger the BSR when the BSR trigger condition is met, where deferring triggering the BSR may be triggering the BSR after a deferral timer time expires. In a transmission process for transmitting a BSR, when a numeric value randomly allocated to the BSR is less than or equal to a preset threshold, the UE may control the to-be-controlled RB to prohibit transmitting the BSR when a BSR transmission condition is met, and when the numeric value randomly allocated to the BSR is greater than the preset threshold, the UE may control the to-be-controlled RB to immediately transmit the BSR when the BSR transmission condition is met. In a process for triggering an SR, when a numeric value randomly allocated to the SR is less than or equal to a preset threshold, the UE may control the to-be-controlled RB to prohibit triggering the SR when an SR transmission condition is met, and when the numeric value randomly allocated to the SR is greater than the preset threshold, the UE controls the RB to immediately trigger the SR when the SR transmission condition is met. In a process for transmitting an SR, when a numeric value randomly allocated to the SR is less than or equal to a preset threshold, the UE may control the to-be-controlled RB to prohibit transmitting the SR when an SR transmission condition is met, and when the numeric value randomly allocated to the SR is greater than the preset threshold, the UE may control the to-be-controlled RB to immediately transmit the SR when the SR transmission condition is met. In a process for triggering an RA, when a numeric value randomly allocated to the RA is less than or equal to a preset threshold, the UE may control the to-be-controlled RB to prohibit triggering the RA when an RA transmission condition is met, and when the numeric value randomly allocated to the RA is greater than the preset threshold, the UE may control the to-be-controlled RB to immediately trigger the RA when the RA transmission condition is met. In a process for transmitting an RA, when a numeric value randomly allocated to the RA is less than or equal to a preset threshold, the UE may control the to-be-controlled RB to prohibit transmitting the RA when an RA transmission condition is met, and when the numeric value randomly allocated to the RA is greater than the preset threshold, the UE controls the to-be-controlled RB to immediately transmit the RA when the RA transmission condition is met. A transmission mode in which the to-be-controlled RB is controlled according to the determining result to transmit the data is not limited to the embodiment described above. The transmission mode may be changed according to an instruction carried in a specific transmission control instruction.

Figure 5:
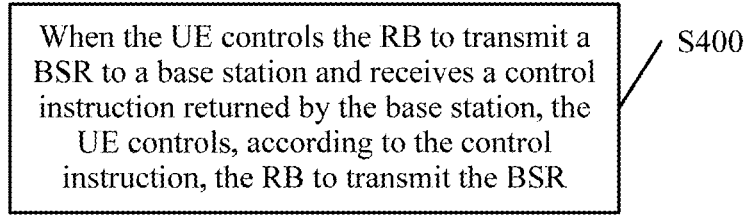
FIG. 5 is a flowchart of still another embodiment of a method for controlling data transmission according to the present invention.

Referring to FIG. 5, FIG. 5 is a flowchart of still another embodiment of a method for controlling data transmission according to the present invention. As shown in FIG. 5, the method for controlling data transmission in this embodiment may include the following step:

S400. When the UE controls the to-be-controlled RB to transmit a BSR to a base station and receives a control instruction returned by the base station, the UE controls, according to the control instruction, the RB to transmit the BSR.

Specifically, in this embodiment, when the to-be-controlled RB meets a BSR trigger condition, reference may be made to the BSR trigger conditions described in the embodiment of the resource scheduling mechanism in the LTE system. 1. A BSR is triggered when a logical channel with a higher priority has transmittable data. 2. A BSR is triggered when data increases from zero (that is, all logical channels previously do not have transmittable data, and then a certain logical channel has transmittable data). 3. When the UE is in an uplink synchronization state, the base station configures a periodic BSR timer for the UE. After the timer expires, a process of scanning logical channels by the UE is triggered, and the UE obtains an uplink transmission data size of the UE and then triggers a BSR. When the RB meets any one of the foregoing conditions, a BSR is triggered. After the BSR is triggered, when the UE acquires an uplink resource, the UE may apply the transmission control parameter to control whether to immediately transmit the BSR. When the BSR is controlled to be transmitted immediately, the UE transmits the BSR to the base station. It is understandable that BSR triggering and transmission in this embodiment may comply with the prior art. In this embodiment, the base station may further comprehensively determine, according to terminal information or service data or the like carried in the BSR, whether to control reception and return the control instruction. The control instruction returned by the base station may include a deferral instruction and a barring instruction. After the BSR is transmitted, if the control instruction returned by the base station and received by the UE is a deferral instruction, where the deferral instruction includes a deferral time parameter, the UE starts a transmission deferral timer, and after the timer expires, the UE transmits the BSR or data. Further, after the BSR is transmitted, if the control instruction returned by the base station and received by the UE is a barring instruction, the UE does not transmit the BSR or data any longer.

Further, in the embodiment of the present invention, the BSR may include at least one logical channel group LCG. The base station may return the barring instruction in the control instruction to instruct to bar reception of one or more LCGs in the BSR, or return the deferral instruction in the control instruction to defer reception of one or more LCGs in the BSR or the like, or return a cancellation instruction in the control instruction to cancel a control operation on one or more LCGs in the BSR or the like, where the control instruction carries at least one LCG identifier. When the UE receives the barring instruction returned by the base station, and the barring instruction carries an LCG identifier, the UE determines a to-be-controlled LCG according to the LCG identifier. After the UE acquires the to-be-controlled LCG, the UE controls the RB to prohibit transmitting the to-be-controlled LCG to the base station. When the UE receives the deferral instruction returned by the base station, and the deferral instruction carries an LCG identifier and a time parameter carried in the deferral instruction, the UE determines a to-be-controlled LCG according to the LCG identifier and acquires the time parameter. After the UE acquires the to-be-controlled LCG, the UE controls the RB not to transmit the to-be-controlled LCG to the base station any longer within a time indicated by the time parameter. Alternatively, after the UE acquires the to-be-controlled LCG, the UE randomly generates a time within a time indicated by the time parameter, and the UE controls the to-be-controlled RB not to transmit the to-be-controlled LCG to the base station any longer within the randomly generated time. When the UE receives the cancellation instruction returned by the base station, and the cancellation instruction carries an LCG identifier, the UE determines a to-be-controlled LCG according to the LCG identifier. After the UE acquires the LCG to be controlled by the cancellation instruction, the UE also cancels a control operation on the to-be-controlled LCG. For example, if the UE previously controls deferred transmission of a certain LCG after the UE receives the cancellation instruction, the UE cancels the control on deferred transmission of the LCG.

Further, in the embodiment of the present invention, the LCG may include at least one logical channel LCH. The base station may return the barring instruction in the control instruction to instruct to bar reception of one or more LCHs in the LCG, or return the deferral instruction in the control instruction to defer reception of one or more LCHs in the LCG or the like, or return a cancellation instruction in the control instruction to cancel a control operation on one or more LCHs in the LCG or the like, where the control instruction carries at least one LCH identifier. When the UE receives the barring instruction returned by the base station, and the barring instruction carries an LCH identifier, the UE determines, according to the LCH identifier, an LCH to be controlled by the barring instruction. After the UE acquires the LCH to be controlled by the barring instruction, the UE controls the RB to prohibit transmitting the to-be-controlled LCH to the base station. When the UE receives the deferral instruction returned by the base station, and the deferral instruction carries an LCH identifier and a time parameter, the UE determines, according to the LCH identifier, an LCH to be controlled by the deferral instruction. After the UE acquires the LCH to be controlled by the deferral instruction, the UE controls the RB not to transmit the to-be-controlled LCH to the base station within any longer a time indicated by the time parameter. Alternatively, after the UE acquires the LCH to be controlled by the deferral instruction, the UE randomly generates a time within a time indicated by the time parameter, and the UE controls the RB not to transmit, within the randomly generated time, the LCH to be controlled by the deferral instruction to the base station any longer. When the UE receives the cancellation instruction returned by the base station, and the cancellation instruction carries an LCH identifier, the UE determines, according to the LCH identifier, an LCH to be controlled by the cancellation instruction. After the UE acquires the LCH to be controlled by the cancellation instruction, the UE cancels a control operation on the to-be-controlled LCH. For example, if the UE previously controls deferred transmission of a certain LCH, after the UE receives the cancellation instruction, the UE cancels the control on deferred transmission of the LCH.

Figure 6:
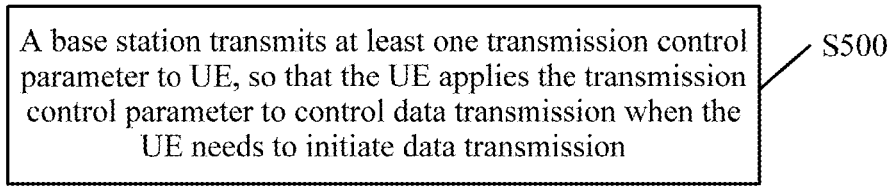
FIG. 6 is a flowchart of still another embodiment of a method for controlling data transmission according to the present invention.

Referring to FIG. 6, FIG. 6 is a flowchart of still another embodiment of a method for controlling data transmission according to the present invention. The following describes, from a base station side, a method for controlling data transmission. As shown in FIG. 6, the method for controlling data transmission in this embodiment may include the following step:

S500. A base station transmits at least one transmission control parameter to UE, so that the UE applies the transmission control parameter to control data transmission when the UE needs to initiate data transmission.

Specifically, in this embodiment, the base station may generate a transmission control parameter according to controlling data transmission of different UEs. The transmission control parameter includes an instruction for controlling a data transmission form, for example, an instruction for transmitting data immediately, an instruction for transmitting data regularly, an instruction for prohibiting transmitting data, and an instruction for deferring transmitting data. The control parameter may carry at least one UE identifier and at least one RB identifier. The base station also identifies the to-be-controlled UE and a to-be-controlled RB by using the UE identifier and the RB identifier. The RB identifier may be an ID of an RB or an ID of an RB group. Further, the RB identifier may be an LCH ID, and the base station identifies, by using the LCH ID, an RB including the LCH ID; or the RB identifier may be an LCG ID, and the base station identifies, by using the LCG ID, an RB including the LCG ID; or the RB identifier may be a QCI.

Further, the transmission control parameter may further carry a data type identifier, and the UE identifies to-be-controlled data by acquiring the data type identifier in the transmission control parameter, and configures the transmission control parameter for to-be-controlled data of an identified data type. Specifically, for example, the data type identifier may include a BSR trigger type, a BSR transmission type, an SR trigger type, and an SR transmission type, where the data type identifier may include one or more data types. When the data type identifier carried in the transmission control parameter is a BSR trigger type identifier, the UE identifies the BSR trigger identifier and acquires that the data to be controlled by the transmission control parameter is BSR trigger data, that is, when the UE triggers a BSR, the UE may control a BSR trigger process of the UE according to the transmission control parameter. When the data type identifier carried in the transmission control parameter is a BSR transmission type identifier, the UE identifies the BSR transmission type identifier and acquires that the transmission control parameter is BSR transmission data, that is, when the UE transmits a BSR, the UE may control a BSR transmission process according to the transmission control parameter carrying the BSR transmission type identifier. Likewise, identification and control processes of the transmission control parameter carrying an SR trigger type identifier or an SR transmission type identifier are the same as above and are not repeated herein.

Further, for example, specific information in the transmission control parameter, or a control result reflected when the transmission control parameter is applied by the UE, may be: when a BSR trigger condition of the UE is met, the UE applies the transmission control parameter of the to-be-controlled RB to control the to-be-controlled RB to defer triggering a BSR for a predetermined time when a signal indicating that the BSR trigger condition is met is received, where the transmission control parameter includes a parameter instruction for controlling deferred triggering of the BSR. Further, when the BSR trigger condition of the UE is met, and an uplink resource is available for transmitting the BSR, the UE may apply the transmission control parameter of the to-be-controlled RB to control the to-be-controlled RB to prohibit transmitting the BSR when a signal indicating that an uplink resource is available for transmission is received. Likewise, the UE may apply the transmission control parameter of the to-be-controlled RB to control the to-be-controlled RB to defer triggering a BSR or an SR or an RA for a predetermined time when a BSR or SR or RA trigger condition is met (or not met); or the UE may apply the transmission control parameter of the to-be-controlled RB to control the to-be-controlled RB to transmit a BSR or an SR or an RA or data immediately when a BSR or SR or RA or data transmission condition is met (or not met); or the UE may apply the transmission control parameter of the to-be-controlled RB to control the RB to prohibit transmitting an SR or an RA or data when a BSR or SR or RA or data transmission condition is met (or not met). Further, a deferral timer may be included for deferring transmitting the BSR or SR or RA or data. When the time during which the BSR or SR or RA or data is deferred under control of the UE exceeds the deferral timer, the UE transmits the BSR or SR or RA or data. A length of the deferral timer may be configured in the transmission control parameter by the base station, or may be obtained according to a certain rule and based on a length configured in the transmission control parameter. For example, the length of the timer is a randomly generated value from 0 to the length configured in the transmission control parameter. The specific rule is not limited herein.

We can understand from above that the transmission control parameter may control the resource request and scheduling of the UE. When the UE is in a case of network congestion, the base station controls resource scheduling of different UEs by generating a transmission control parameter, to ensure effective data transmission of high-priority users or users that require emergency calls. Therefore, the base station may provide differentiated services for different users, and user experience is improved effectively.

Further, specific information carried in the transmission control parameter may further achieve the following control objective. When the transmission control parameter is applied by the UE, the transmission control parameter controls the UE to randomly allocate a numeric value to the data, and the transmission control parameter controls the UE to generate a threshold (or the transmission control parameter carries a threshold). Further, the UE determines whether the numeric value randomly allocated to the data is less than a preset threshold, so that the UE controls, according to a determining result, the to-be-controlled RB to transmit the data. In an actual application, for example, that the UE controls, according to a determining result, the to-be-controlled RB to transmit the data, may be: in the data transmission process, when the numeric value randomly allocated to the data is less than or equal to the preset threshold, the UE may control the to-be-controlled RB to defer transmitting the data, and when the numeric value randomly allocated to the data is greater than the preset threshold, the UE may control the RB to prohibit transmitting the data. Likewise, in a transmission process for triggering a BSR, when a numeric value randomly allocated to the BSR is less than or equal to a preset threshold, the UE may control the to-be-controlled RB to defer triggering the BSR when the BSR trigger condition is met, and when the numeric value randomly allocated to the BSR is greater than the preset threshold, the UE may control the to-be-controlled RB to immediately trigger the BSR when the BSR trigger condition is met, where deferring triggering the BSR may be triggering the BSR after a deferral timer time expires. In a transmission process for transmitting a BSR, when a numeric value randomly allocated to the BSR is less than or equal to a preset threshold, the UE may control the to-be-controlled RB to prohibit transmitting the BSR when a BSR transmission condition is met, and when the numeric value randomly allocated to the BSR is greater than the preset threshold, the UE may control the to-be-controlled RB to immediately transmit the BSR when the BSR transmission condition is met. In a process for triggering an SR, when a numeric value randomly allocated to the SR is less than or equal to a preset threshold, the UE may control the to-be-controlled RB to prohibit triggering the SR when an SR transmission condition is met, and when the numeric value randomly allocated to the SR is greater than the preset threshold, the UE may control the to-be-controlled RB to immediately trigger the SR when the SR transmission condition is met. In a process for transmitting an SR, when a numeric value randomly allocated to the SR is less than or equal to a preset threshold, the UE may control the to-be-controlled RB to prohibit transmitting the SR when an SR transmission condition is met, and when the numeric value randomly allocated to the SR is greater than the preset threshold, the UE may control the to-be-controlled RB to immediately transmit the SR when the SR transmission condition is met. In a process for triggering an RA, when a numeric value randomly allocated to the RA is less than or equal to a preset threshold, the UE may control the to-be-controlled RB to prohibit triggering the RA when an RA transmission condition is met, and when the numeric value randomly allocated to the RA is greater than the preset threshold, the UE may control the RB to immediately trigger the RA when the RA transmission condition is met. In a process for transmitting an RA, when a numeric value randomly allocated to the RA is less than or equal to a preset threshold, the UE may control the to-be-controlled RB to prohibit transmitting the RA when an RA transmission condition is met, and when the numeric value randomly allocated to the RA is greater than the preset threshold, the UE controls the to-be-controlled RB to immediately transmit the RA when the RA transmission condition is met. A transmission mode in which the to-be-controlled RB is controlled according to the determining result to transmit the data is not limited to the embodiment described above. The transmission mode may be changed according to an instruction carried in a specific transmission control instruction.

Referring to FIG. 7, FIG. 7 is a flowchart of still another embodiment of a method for controlling data transmission according to the present invention. As shown in FIG. 7, the method for controlling data transmission in this embodiment may include the following step:

S600. A base station transmits information to UE, where the information carries at least one transmission control parameter, and the information includes at least one of a system broadcast message, a paging message, an RRC message, or a MAC message.

Specifically, in this embodiment, when the base station transmits the information to the UE, the information may carry a transmission control parameter. The information may be at least one of the system broadcast message, paging message, RRC message, and MAC message transmitted by the base station. The base station configures the transmission control parameter for a to-be-controlled RB of the UE by using the information in the at least one of the system broadcast message, paging message, RRC message, and MAC message.

Referring to FIG. 8, FIG. 8 is a flowchart of still another embodiment of a method for controlling data transmission according to the present invention. As shown in FIG. 8, the method for controlling data transmission in this embodiment may include the following steps:

S700. A base station transmits at least one transmission control parameter to UE, so that the UE applies the transmission control parameter to control data transmission when the UE needs to initiate data transmission.

Specifically, in this embodiment, the base station may generate a transmission control parameter for controlling data transmission of different UEs. The transmission control parameter includes an instruction for controlling a data transmission form, for example, an instruction for transmitting data immediately, an instruction for transmitting data regularly, an instruction for prohibiting transmitting data, and an instruction for deferring transmitting data. The control parameter may carry at least one UE identifier and at least one RB identifier. The base station also identifies the to-be-controlled UE and a to-be-controlled RB by using the UE identifier and the RB identifier. The RB identifier may be an ID of an RB or an ID of an RB group. Further, the RB identifier may be an LCH ID, and the base station identifies, by using the LCH ID, an RB including the LCH ID; or the RB identifier may be an LCG ID, and the base station identifies, by using the LCG ID, an RB including the LCG ID; or the RB identifier may be a QCI; or the RB identifier may be an identifier of a data stream in an RB.

Further, for example, specific information in the transmission control parameter, or a control result reflected when the transmission control parameter is applied by the UE, may be: when a BSR trigger condition of the UE is met, the UE applies the transmission control parameter of the to-be-controlled RB to control the to-be-controlled RB to defer triggering a BSR for a predetermined time when a signal indicating that the BSR trigger condition is met is received, where the transmission control parameter includes a parameter instruction for controlling deferred triggering of the BSR. Further, when the BSR trigger condition of the UE is met, and an uplink resource is available for transmitting the BSR, the UE may apply the transmission control parameter of the to-be-controlled RB to control the to-be-controlled RB to prohibit transmitting the BSR when a signal indicating that an uplink resource is available for transmission is received. Likewise, the UE may apply the transmission control parameter of the to-be-controlled RB to control the to-be-controlled RB to defer triggering a BSR or an SR or an RA for a predetermined time when a BSR or SR or RA trigger condition is met (or not met); or the UE may apply the transmission control parameter of the to-be-controlled RB to control the to-be-controlled RB to transmit a BSR or an SR or an RA or data immediately when a BSR or SR or RA or data transmission condition is met (or not met); or the UE may apply the transmission control parameter of the to-be-controlled RB to control the to-be-controlled RB to prohibit transmitting an SR or an RA or data when a BSR or SR or RA or data transmission condition is met (or not met). Further, a deferral timer may be included for deferring transmitting the BSR or SR or RA or data. When the time during which the BSR or SR or RA or data is deferred under control of the UE exceeds the deferral timer, the UE transmits the BSR or SR or RA or data.

We can understand from above that the transmission control parameter may control the resource scheduling of the UE. When the UE is in a case of network congestion, the base station controls resource scheduling of different UEs by generating a transmission control parameter, to ensure effective data transmission of high-priority users or users that require emergency calls. Therefore, the base station may provide differentiated services for different users, and user experience is improved effectively.

Further, specific information carried in the transmission control parameter may further achieve the following control objective. When the transmission control parameter is applied by the UE, the transmission control parameter controls the UE to randomly allocate a numeric value to the data, and the transmission control parameter controls the UE to generate a threshold (or the transmission control parameter carries a threshold). Further, the UE determines whether the numeric value randomly allocated to the data is less than a preset threshold, so that the UE controls, according to a determining result, the to-be-controlled RB to transmit the data. In an actual application, for example, in the data transmission process, when the numeric value randomly allocated to the data is less than or equal to the preset threshold, the UE controls the to-be-controlled RB to defer transmitting the data, and when the numeric value randomly allocated to the data is greater than the preset threshold, the UE controls the to-be-controlled RB to prohibit transmitting the data. Likewise, in a transmission process for triggering a BSR, when a numeric value randomly allocated to the BSR is less than or equal to a preset threshold, the UE controls the to-be-controlled RB to defer triggering the BSR when the BSR trigger condition is met, and when the numeric value randomly allocated to the BSR is greater than the preset threshold, the UE controls the to-be-controlled RB to immediately trigger the BSR when the BSR trigger condition is met, where deferring triggering the BSR may be triggering the BSR after a deferral timer time expires. In a transmission process for transmitting a BSR, when a numeric value randomly allocated to the BSR is less than or equal to a preset threshold, the UE controls the to-be-controlled RB to prohibit transmitting the BSR when a BSR transmission condition is met, and when the numeric value randomly allocated to the BSR is greater than the preset threshold, the UE controls the to-be-controlled RB to immediately transmit the BSR when the BSR transmission condition is met. In a process for triggering an SR, when a numeric value randomly allocated to the SR is less than or equal to a preset threshold, the UE controls the to-be-controlled RB to prohibit triggering the SR when an SR transmission condition is met, and when the numeric value randomly allocated to the SR is greater than the preset threshold, the UE controls the to-be-controlled RB to immediately trigger the SR when the SR transmission condition is met. In a process for transmitting an SR, when a numeric value randomly allocated to the SR is less than or equal to a preset threshold, the UE controls the to-be-controlled RB to prohibit transmitting the SR when an SR transmission condition is met, and when the numeric value randomly allocated to the SR is greater than the preset threshold, the UE controls the to-be-controlled RB to immediately transmit the SR when the SR transmission condition is met. In a process for triggering an RA, when a numeric value randomly allocated to the RA is less than or equal to a preset threshold, the UE controls the to-be-controlled RB to prohibit triggering the RA when an RA transmission condition is met, and when the numeric value randomly allocated to the RA is greater than the preset threshold, the UE controls the to-be-controlled RB to immediately trigger the RA when the RA transmission condition is met. In a process for transmitting an RA, when a numeric value randomly allocated to the RA is less than or equal to a preset threshold, the UE controls the to-be-controlled RB to prohibit transmitting the RA when an RA transmission condition is met, and when the numeric value randomly allocated to the RA is greater than the preset threshold, the UE controls the to-be-controlled RB to immediately transmit the RA when the RA transmission condition is met. A transmission mode in which the to-be-controlled RB is controlled according to the determining result to transmit the data is not limited to the embodiment described above. The transmission mode may be changed according to an instruction carried in a specific transmission control instruction.

S701. The base station transmits a command for enabling the transmission control parameter of the to-be-controlled RB to the UE.

Specifically, in this embodiment, the base station transmits the transmission control parameter to the UE by using the foregoing embodiment, and transmits an instruction to the UE, instructing the UE not to enable the transmission control parameter until the UE receives the enable command transmitted by the base station. The enable command may be an explicit command, or may be implicit system overload information, which is not limited herein.

We can understand from above that, in the embodiment of the present invention, the base station transmits the enable command to instruct the UE to enable the transmission control parameter to control data transmission, which improves flexibility of controlling data transmission by the UE.

Referring to FIG. 9, FIG. 9 is a flowchart of still another embodiment of a method for controlling data transmission according to the present invention. As shown in FIG. 9, the method for controlling data transmission in this embodiment may include the following step:

S800. When the base station receives a BSR that the UE controls the to-be-controlled RB to transmit, the base station returns a control instruction according to the BSR.

Specifically, in this embodiment, the control instruction returned by the base station may include a deferral instruction and a barring instruction. When the base station receives the BSR that the UE controls the to-be-controlled RB to transmit, if the base station determines, according to the BSR, that the BSR may not be received temporarily, the base station may refuse to receive the BSR, and return a deferral instruction, where the deferral instruction includes a deferral time parameter. Therefore, after receiving the deferral instruction, the UE starts a transmission deferral timer, and does not transmit the BSR until the timer expires. Further, when the base station receives the BSR that the UE controls the to-be-controlled RB to transmit, if the base station determines, according to the BSR, that the BSR may be refused to be received, the base station may refuse to receive the BSR, and return a barring instruction, so that the UE does not transmit data any longer.

Further, in the embodiment of the present invention, an LCG may include at least one logical channel group LCH. The base station may return the barring instruction in the control instruction to instruct to bar reception of one or more LCHs in the LCG, or return the deferral instruction in the control instruction to defer reception of one or more LCHs in the LCG or the like, or return a cancellation instruction in the control instruction to cancel a control operation on one or more LCHs in the LCG or the like, where the control instruction carries at least one LCH identifier. When the base station receives the BSR that the UE controls the RB to transmit, if the base station determines, according to the BSR, that a certain LCH or a plurality of LCHs in a certain LCG or a plurality of LCGs in the BSR may not be received temporarily, the base station may refuse to receive the certain LCH or the plurality of LCHs in the BSR, and return a deferral instruction, where the deferral instruction carries an identifier of the certain LCH or the plurality of LCHs refused to be received, and may further carry a deferral time parameter, so that after the UE receives the deferral instruction, the UE acquires the LCH identifier carried in the deferral instruction and the time parameter carried in the deferral instruction, and determines a to-be-controlled LCH according to the LCH identifier. After the UE acquires the to-be-controlled LCH, the UE controls the to-be-controlled RB not to transmit the to-be-controlled LCH to the base station any longer within a time indicated by the time parameter. Alternatively, after the UE acquires the to-be-controlled LCH, the UE randomly generates a time within a time indicated by the time parameter, and the UE controls the to-be-controlled RB not to transmit the to-be-controlled LCH to the base station any longer within the randomly generated time. A transmission deferral timer is started, and after the timer expires, the UE transmits the BSR. Further, when the base station receives the BSR that the UE controls the RB to transmit, if the base station determines, according to the BSR, that a certain LCH or a plurality of LCHs in a certain LCG or a plurality of LCGs in the BSR may be refused to be received, the base station may refuse to receive the certain LCH or the plurality of LCHs in the BSR, and return a barring instruction, where the barring instruction carries an identifier of the certain LCH or the plurality of LCHs refused to be received, so that after the UE receives the barring instruction, the UE acquires the LCH identifier carried in the barring instruction, and confirms a to-be-controlled LCH according to the LCH identifier. After the UE acquires the to-be-controlled LCH, the UE controls the to-be-controlled RB not to transmit the to-be-controlled LCH any longer. Further, when the base station needs to receive a certain LCH or a plurality of LCHs deferred or barred in the BSR, the base station may transmit a cancellation instruction to the UE, where the cancellation instruction carries an identifier of the certain LCH or the plurality of LCHs deferred or barred, so that when the UE receives the cancellation instruction, the UE cancels a control operation on the to-be-controlled LCH.

In the present invention, the embodiments corresponding to FIG. 2 to FIG. 9 are all applicable to the resource scheduling mechanism in the LTE system in the embodiment corresponding to FIG. 1.

Referring to FIG. 10, FIG. 10 shows a terminal device provided by an embodiment of the present invention. In the following embodiments, UE is used to represent a terminal device. As shown in FIG. 10, the terminal device in this embodiment may include:

A first receiving unit 100 is configured to receive at least one transmission control parameter transmitted by a base station.

Specifically, in this embodiment, the first receiving unit 100 in RRC (Radio Resource Control, Radio Resource Control protocol) connected mode receives the at least one transmission control parameter transmitted by the base station. The control parameter may carry at least one terminal device UE identifier. The control parameter may further carry at least one RB identifier.

We can understand from above that when the first receiving unit 100 receives the transmission control parameter transmitted by the base station, the first receiving unit 100 may acquire the UE identifier carried in the transmission control parameter, and notify the UE to determine whether the UE identifier matches the UE. Further, when the UE determines that the UE identifier carried in the transmission control parameter matches the UE, the UE receives the transmission control parameter transmitted by the base station; when the UE determines that the UE identifier carried in the transmission control parameter does not match the UE, the UE refuses to receive the transmission control parameter transmitted by the base station. A plurality of UEs may receive a same transmission control parameter, and in this case, the transmission control parameter carries a plurality of UE identifiers. In the embodiment of the present invention, the transmission control parameter may be notified to the UE by using a system broadcast message or a dedicated RRC message, or is fixed in a protocol, which is not limited herein.

Further, the first receiving unit 100 may acquire the RB identifier in the transmission control parameter, so that the UE configures the transmission control parameter for an RB or a group of RBs according to the RB identifier in the transmission control parameter. The RB identifier may be an ID (Identifier) of an RB, and the UE confirms a to-be-controlled RB according to the ID; or the RB identifier may be an ID of an RB group, and the UE confirms a group of to-be-controlled RBs according to the ID of the RB group, that is, a same transmission control parameter may be configured for a plurality of RBs. In addition, a plurality of different transmission control parameters may be configured for one RB. Further, the RB identifier may be an LCH (Logical Channel Identifier, logical channel) ID, and the UE confirms, according to the LCH ID, a to-be-controlled RB including the LCH ID; or the RB identifier may be an LCG (Logical Channel Group) ID, and the UE confirms, according to the LCG ID, a to-be-controlled RB including the LCG ID; or the RB identifier may be a QCI (QoS (Quality of Service) Class Identifier, class identifier), and the UE confirms a to-be-controlled RB according to the QCI.

Further, the transmission control parameter may further carry a data type identifier, and the first receiving unit 100 identifies to-be-controlled data by acquiring the data type identifier in the transmission control parameter, and configures the transmission control parameter for to-be-controlled data of an identified data type. Specifically, for example, the data type identifier may include a BSR trigger type, a BSR transmission type, an SR trigger type, and an SR transmission type, where the data type identifier may include one or more data types. When the data type identifier carried in the transmission control parameter is a BSR trigger type identifier, the UE identifies the BSR trigger identifier and acquires that the data to be controlled by the transmission control parameter is BSR trigger data, that is, when the UE triggers a BSR, the UE may control a BSR trigger process of the UE according to the transmission control parameter. When the data type identifier carried in the transmission control parameter is a BSR transmission type identifier, the UE identifies the BSR transmission type identifier and acquires that the transmission control parameter is BSR transmission data, that is, when the UE transmits a BSR, the UE may control a BSR transmission process according to the transmission control parameter carrying the BSR transmission type identifier. Likewise, identification and control processes of the transmission control parameter carrying an SR trigger type identifier or an SR transmission type identifier are the same as above and are not repeated herein.

An application unit 200 is configured to apply the transmission control parameter to control data transmission when the terminal device needs to initiate data transmission to the base station.

Specifically, in this embodiment, reference may be made to the description of the embodiment of the resource scheduling mechanism in the LTE system in FIG. 1. When the UE needs to initiate data transmission to the base station, the UE triggers a BSR, and performs a series of resource request and scheduling processes. In the resource request and scheduling processes, the application unit 200 applies a transmission control parameter of an RB to control the resource request and scheduling of the RB, and thereby controls the RB to transmit data to the base station, where controlling data transmission may be controlling immediate transmission or immediate triggering, deferred transmission or deferred triggering, or prohibited transmission or prohibited triggering of data. For example, when a BSR trigger condition of the UE is met, the application unit 200 applies the transmission control parameter of the RB to control the RB to defer triggering a BSR for a predetermined time when a signal indicating that the BSR trigger condition is met is received, where the transmission control parameter includes a parameter instruction for controlling deferred triggering of the BSR. Further, when the BSR trigger condition of the UE is met, and an uplink resource is available for transmitting the BSR, the application unit 200 may apply the transmission control parameter of the RB to control the RB to prohibit transmitting the BSR when a signal indicating that an uplink resource is available for transmission is received. Likewise, the application unit 200 may apply the transmission control parameter of the RB to control the RB to defer triggering a BSR or an SR or an RA for a predetermined time when a BSR or SR or RA trigger condition is met (or not met); or the application unit 200 may apply the transmission control parameter of the RB to control the RB to transmit a BSR or an SR or an RA or data immediately when a BSR or SR or RA or data transmission condition is met (or not met); or the application unit 200 may apply the transmission control parameter of the RB to control the RB to prohibit transmitting an SR or an RA or data when a BSR or SR or RA or data transmission condition is met (or not met). Further, a deferral timer may be included for deferring transmitting the BSR or SR or RA or data. When the time during which the BSR or SR or RA or data is deferred under control of the application unit 200 exceeds the deferral timer, the UE transmits the BSR or SR or RA or data. A length of the deferral timer may be configured in the transmission control parameter by the base station, or may be obtained according to a certain rule and based on a length configured in the transmission control parameter. For example, the length of the timer is a randomly generated value from 0 to the length configured in the transmission control parameter. The specific rule is not limited herein.

We can understand from above that the transmission control parameter may control the resource request and scheduling of the UE. When the UE is in a case of network congestion, if data of a certain RB or certain RBs meets the BSR trigger condition, the UE may defer or prohibit triggering a BSR for the data of the certain RB or certain RBs by using the transmission control parameter, to ensure that data of other RBs or UEs is transmitted effectively. If a BSR is triggered, and the UE has an uplink resource for transmitting the BSR, the application unit 200 may control deferred transmission of the BSR by using the transmission control parameter, to ensure that data of other RBs or UEs is transmitted effectively. If the UE does not have an uplink resource for transmitting the BSR and needs to trigger an SR, the application unit 200 may control deferred triggering or deferred transmission of the SR or the like by using the transmission control parameter, to ensure that data of other RBs or UEs is transmitted effectively. The transmission parameter carries different control parameter instructions according to control requirements of the base station. Further, the UE may control data transmission according to an instruction of the base station, so that an objective of controlling the UE to transmit important data and barring the UE from transmitting data that is temporarily unimportant is achieved in a case of network congestion. This effectively improves utilization of network resources and improves user experience.

Further, specific information carried in the transmission control parameter may further achieve the following control objective. When the transmission control parameter is applied by the application unit 200, the transmission control parameter controls the UE to randomly allocate a numeric value to the data, and the transmission control parameter controls the UE to generate a threshold (or the transmission control parameter carries a threshold). Further, the UE determines whether the numeric value randomly allocated to the data is less than a preset threshold, so that the UE controls, according to a determining result, the RB to transmit the data. In an actual application, for example, that the UE controls, according to a determining result, the RB to transmit the data, may be: in the data transmission process, when the numeric value randomly allocated to the data is less than or equal to the preset threshold, the UE may control the RB to defer transmitting the data, and when the numeric value randomly allocated to the data is greater than the preset threshold, the UE may control the RB to prohibit transmitting the data. Likewise, in a transmission process for triggering a BSR, when a numeric value randomly allocated to the BSR is less than or equal to a preset threshold, the UE may control the RB to defer triggering the BSR when the BSR trigger condition is met, and when the numeric value randomly allocated to the BSR is greater than the preset threshold, the UE may control the RB to immediately trigger the BSR when the BSR trigger condition is met, where deferring triggering the BSR may be triggering the BSR after a deferral timer time expires. In a transmission process for transmitting a BSR, when a numeric value randomly allocated to the BSR is less than or equal to a preset threshold, the UE may control the RB to prohibit transmitting the BSR when a BSR transmission condition is met, and when the numeric value randomly allocated to the BSR is greater than the preset threshold, the UE may control the RB to immediately transmit the BSR when the BSR transmission condition is met. In a process for triggering an SR, when a numeric value randomly allocated to the SR is less than or equal to a preset threshold, the UE may control the RB to prohibit triggering the SR when an SR transmission condition is met, and when the numeric value randomly allocated to the SR is greater than the preset threshold, the UE may control the RB to immediately trigger the SR when the SR transmission condition is met. In a process for transmitting an SR, when a numeric value randomly allocated to the SR is less than or equal to a preset threshold, the UE may control the RB to prohibit transmitting the SR when an SR transmission condition is met, and when the numeric value randomly allocated to the SR is greater than the preset threshold, the UE may control the RB to immediately transmit the SR when the SR transmission condition is met. In a process for triggering an RA, when a numeric value randomly allocated to the RA is less than or equal to a preset threshold, the UE may control the RB to prohibit triggering the RA when an RA transmission condition is met, and when the numeric value randomly allocated to the RA is greater than the preset threshold, the UE may control the RB to immediately trigger the RA when the RA transmission condition is met. In a process for transmitting an RA, when a numeric value randomly allocated to the RA is less than or equal to a preset threshold, the UE may control the RB to prohibit transmitting the RA when an RA transmission condition is met, and when the numeric value randomly allocated to the RA is greater than the preset threshold, the UE may control the RB to immediately transmit the RA when the RA transmission condition is met. A transmission mode in which the RB is controlled according to the determining result to transmit the data is not limited to the embodiment described above. The transmission mode may be changed according to an instruction carried in a specific transmission control instruction.

Further, when the UE needs to initiate data transmission to the base station, the application unit 200 may further apply the transmission control parameter matching the data type, to control transmission of data of the corresponding data type. For the process in which the application unit 200 applies the transmission control parameter matching the data type, to control transmission of data of the corresponding data type, reference may be made to the foregoing description, and details are not repeated herein.

Figure 11:
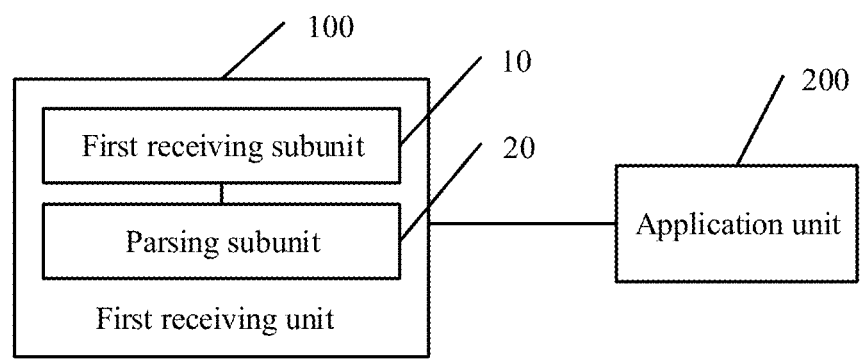
FIG. 11 is a structural diagram of another embodiment of a terminal device according to the present invention.

Referring to FIG. 11, FIG. 11 shows a terminal device provided by an embodiment of the present invention. As shown in FIG. 11, the terminal device in this embodiment may include a first receiving unit 100 and an application unit 200.

The first receiving unit 100 may include:

A first receiving subunit 10 is configured to receive information transmitted by a base station, where the information includes at least one of a system broadcast message, a paging message, an RRC message, or a MAC message.

Specifically, in this embodiment, the information received by the first receiving subunit 10 may carry a transmission control parameter. The information may be at least one of the system broadcast message, paging message, RRC message, and MAC message transmitted by the base station. The base station configures the transmission control parameter for an RB of the UE by using the information in the at least one of the system broadcast message, paging message, RRC message, and MAC message.

A parsing subunit 20 is configured to parse the information to acquire the at least one transmission control parameter.

Specifically, in this embodiment, the parsing subunit 20 parses the information in the at least one of the system broadcast message, paging message, RRC message, and MAC message received by the first receiving subunit 20, to obtain the transmission control parameter. The UE includes at least one RB, and the control parameter may carry at least one RB identifier, where the RB identifier may identify a to-be-controlled RB. Alternatively, the control parameter may carry a data type identifier, where the data type identifier may identify to-be-controlled data.

In the embodiment of the present invention, when the parsing subunit 20 acquires the at least one transmission control parameter by parsing the information, the UE may acquire the RB identifier in the transmission control parameter, so that the UE determines, according to an RB identified by the RB identifier in the transmission control parameter, that an RB or a group of RBs is an RB to be controlled by the transmission control parameter. The RB identifier may be an ID of an RB, and the UE confirms a to-be-controlled RB according to the ID; or the RB identifier may be an ID of an RB group, and the UE confirms a group of to-be-controlled RBs according to the ID of the RB group, that is, a same transmission control parameter may be configured for a plurality of RBs. In addition, a plurality of different transmission control parameters may be configured for one RB. Further, the RB identifier may be an LCH ID, and the UE confirms, according to the LCH ID, a to-be-controlled RB including the LCH ID; or the RB identifier may be an LCG ID, and the UE confirms, according to the LCG ID, a to-be-controlled RB including the LCG ID; or the RB identifier may be a QCI, and the UE confirms a to-be-controlled RB according to the QCI.

Further, the transmission control parameter may further carry a data type identifier, and the UE identifies to-be-controlled data by acquiring the data type identifier in the transmission control parameter, and configures the transmission control parameter for to-be-controlled data of an identified data type. Specifically, for example, the data type identifier may include a BSR trigger type, a BSR transmission type, an SR trigger type, and an SR transmission type, where the data type identifier may include one or more data types. When the data type identifier carried in the transmission control parameter is a BSR trigger type identifier, the UE identifies the BSR trigger identifier and acquires that the data to be controlled by the transmission control parameter is BSR trigger data, that is, when the UE triggers a BSR, the UE may control a BSR trigger process of the UE according to the transmission control parameter. When the data type identifier carried in the transmission control parameter is a BSR transmission type identifier, the UE identifies the BSR transmission type identifier and acquires that the transmission control parameter is BSR transmission data, that is, when the UE transmits a BSR, the UE may control a BSR transmission process according to the transmission control parameter carrying the BSR transmission type identifier. Likewise, identification and control processes of the transmission control parameter carrying an SR trigger type identifier or an SR transmission type identifier are the same as above and are not repeated herein.

Figure 12:
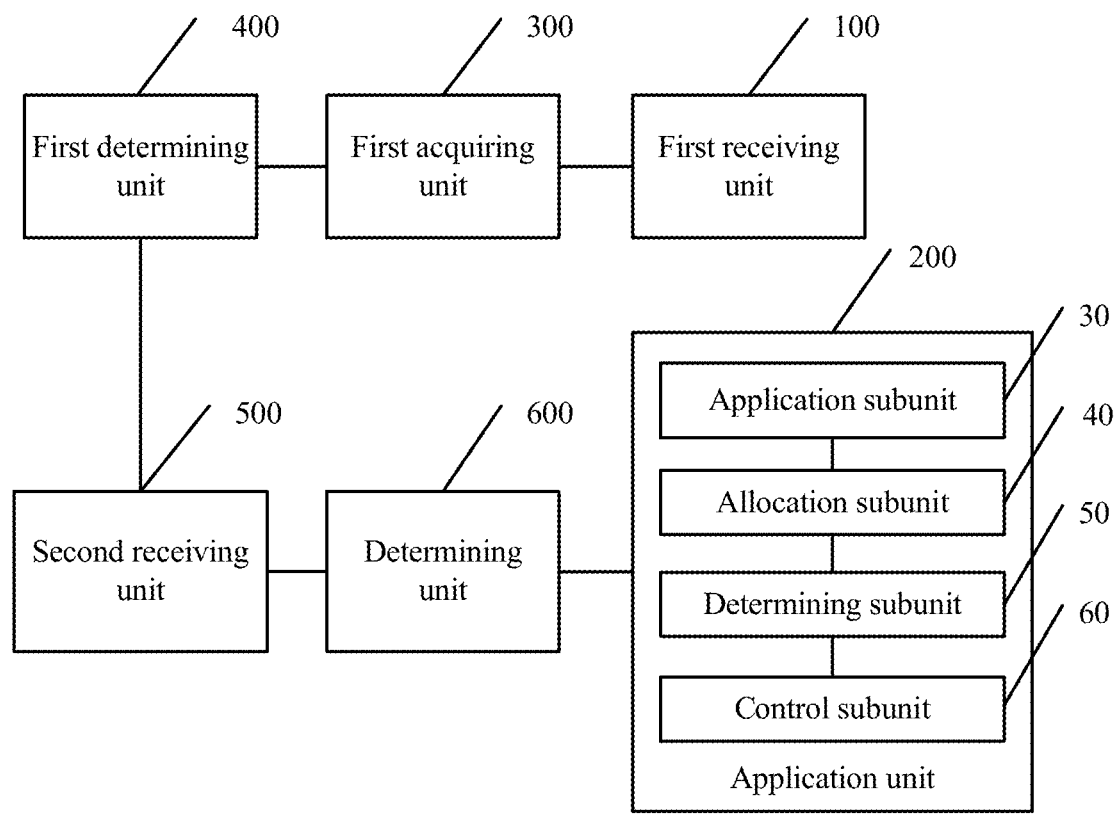
FIG. 12 is a structural diagram of still another embodiment of a terminal device according to the present invention.

Referring to FIG. 12, FIG. 12 shows a terminal device provided by an embodiment of the present invention. As shown in FIG. 12, the terminal device in this embodiment may include a first receiving unit 100 and an application unit 200.

The terminal device further includes:

A first acquiring unit 300 is configured to acquire an RB identifier carried in the transmission control parameter.

In the embodiment of the present invention, the first acquiring unit 300 may acquire the RB identifier carried in the transmission control parameter. The RB identifier may be an ID of an RB, and the UE confirms a to-be-controlled RB according to the ID; or the RB identifier may be an ID of an RB group, and the UE confirms a group of to-be-controlled RBs according to the ID of the RB group, that is, a same transmission control parameter may be configured for a plurality of RBs. In addition, a plurality of different transmission control parameters may be configured for one RB. Further, the RB identifier may be an LCH ID, and the UE confirms, according to the LCH ID, a to-be-controlled RB including the LCH ID; or the RB identifier may be an LCG ID, and the UE confirms, according to the LCG ID, a to-be-controlled RB including the LCG ID; or the RB identifier may be a QCI, and the UE confirms a to-be-controlled RB according to the QCI.

A first determining unit 400 is configured to determine that an RB identified by the RB identifier carried in the transmission control parameter is an RB to be controlled by the transmission control parameter.

In the embodiment of the present invention, the first determining unit 400 may determine, according to the RB identifier in the transmission control parameter, that the identified RB is the RB to be controlled by the transmission control parameter, where the to-be-controlled RB may be an RB or a group of RBs. The first determining unit 400 makes confirmation according to the RB identifier carried in the transmission control parameter.

A second receiving unit 500 is configured to determine that the RB identified by the RB identifier carried in the transmission control parameter is the RB to be controlled by the transmission control parameter.

Specifically, in this embodiment, when receiving a transmission control parameter configured by a base station, the UE may not apply the transmission control parameter immediately first. When the second receiving unit 500 receives a command, transmitted by the base station, for enabling the transmission control parameter of the to-be-controlled RB, the UE applies the transmission control parameter to control data transmission. The enable command may be an explicit command, or may be implicit system overload information, which is not limited herein.

Further, when congestion occurs in the base station, or the base station transmits congestion level information to the terminal, the UE may apply the transmission control parameter according to a congestion level, and in this case, different congestion levels may correspond to different transmission control parameters.

We can understand from above that, in the embodiment of the present invention, the base station transmits the enable command or notification information to instruct the UE to enable the transmission control parameter to control data transmission, which improves flexibility of controlling data transmission by the UE.

A determining unit 600 is configured to determine whether the data meets a preset transmission condition, and when the data meets the preset transmission condition, notify the application unit to apply the transmission control parameter to control data transmission.

In the embodiment of the present invention, the preset transmission condition is that a transmission condition for triggering data transmission is met in a case in which there is no parameter for control. For example, for BSR trigger conditions, reference may be made to the BSR trigger conditions described in the embodiment of the resource scheduling mechanism in the LTE system. 1. A BSR is triggered when a logical channel with a higher priority has transmittable data. 2. A BSR is triggered when data increases from zero (that is, all logical channels previously do not have transmittable data, and then a certain logical channel has transmittable data). 3. When the UE is in an uplink synchronization state, the base station configures a periodic BSR timer for the UE. After the timer expires, a process of scanning logical channels by the UE is triggered, and the UE obtains an uplink transmission data size of the UE and then triggers a BSR.

The application unit 200 further includes:

An application subunit 30 is configured to apply the transmission control parameter of the to-be-controlled RB to control the to-be-controlled RB to transmit the data to the base station.

Specifically, in this embodiment, reference may be made to the description of the embodiment of the resource scheduling mechanism in the LTE system. When the UE needs to initiate data transmission to the base station, the UE triggers a BSR, and performs a series of resource request and scheduling processes. In the resource request and scheduling processes, the application subunit 30 applies a transmission control parameter of an RB to control the resource request and scheduling of the RB, and thereby controls the RB to transmit data to the base station, where controlling data transmission may be controlling immediate transmission or immediate triggering, deferred transmission or deferred triggering, or prohibited transmission or prohibited triggering of data. For example, when a BSR trigger condition of the UE is met, the application subunit 30 applies the transmission control parameter of the RB to control the RB to defer triggering a BSR for a predetermined time when a signal indicating that the BSR trigger condition is met is received, where the transmission control parameter includes a parameter instruction for controlling deferred triggering of the BSR. Further, when the BSR trigger condition of the UE is met, and an uplink resource is available for transmitting the BSR, the UE may apply the transmission control parameter of the RB to control the RB to prohibit transmitting the BSR when a signal indicating that an uplink resource is available for transmission is received. Likewise, the application subunit 30 may apply the transmission control parameter of the RB to control the RB to defer triggering a BSR or an SR or an RA for a predetermined time when a BSR or SR or RA trigger condition is met (or not met); or the application subunit 30 may apply the transmission control parameter of the RB to control the RB to transmit a BSR or an SR or an RA or data immediately when a BSR or SR or RA or data transmission condition is met (or not met); or the application subunit 30 may apply the transmission control parameter of the RB to control the RB to prohibit transmitting an SR or an RA or data when a BSR or SR or RA or data transmission condition is met (or not met). Further, a deferral timer may be included for deferring transmitting the BSR or SR or RA or data. When the time during which the BSR or SR or RA or data is deferred under control of the UE exceeds the deferral timer, the UE transmits the BSR or SR or RA or data. A length of the deferral timer may be configured in the transmission control parameter by the base station, or may be obtained according to a certain rule and based on a length configured in the transmission control parameter. For example, the length of the timer is a randomly generated value from 0 to the length configured in the transmission control parameter. The specific rule is not limited herein.

We can understand from above that the transmission control parameter may control the resource request and scheduling of the UE. When the UE is in a case of network congestion, if a certain RB or certain RBs meet the BSR trigger condition, the UE may defer or prohibit triggering a BSR for the certain RB or certain RBs by using the transmission control parameter, to ensure that data of other RBs or UEs is transmitted effectively. If a BSR is triggered, and the UE has an uplink resource for transmitting the BSR, the UE may control deferred transmission of the BSR by using the transmission control parameter, to ensure that data of other RBs or UEs is transmitted effectively. If the UE does not have an uplink resource for transmitting the BSR, the UE may control deferred triggering or deferred transmission of an SR or the like by using the transmission control parameter, to ensure that data of other RBs or UEs is transmitted effectively. The transmission parameter carries different control parameter instructions according to control requirements of the base station. Further, the UE may control data transmission according to an instruction of the base station, so that an objective of controlling the UE to transmit important data and barring the UE from transmitting data that is temporarily unimportant is achieved in a case of network congestion. This effectively improves utilization of network resources and improves user experience.

An allocation subunit 40 is configured to randomly allocate a numeric value to the data according to the transmission control parameter.

In the embodiment of the present invention, when the transmission control parameter is applied by the UE, the transmission control parameter controls the allocation subunit 40 to randomly allocate a numeric value to the data, and the transmission control parameter controls the UE to generate a threshold (or the transmission control parameter carries a threshold).

A determining subunit 50 is configured for the terminal device to determine whether the numeric value is less than a preset threshold.

In the embodiment of the present invention, the determining subunit 50 determines whether the numeric value randomly allocated to the data is less than the preset threshold, and thereby, the UE controls, according to a determining result of the determining subunit 50, the to-be-controlled RB to transmit the data.

A control subunit 60 is configured to control, according to the determining result, the to-be-controlled RB to transmit the data.

In the embodiment of the present invention, in an actual application, for example, that the control subunit 60 controls, according to the determining result, the to-be-controlled RB to transmit the data, may be: in the data transmission process, when the numeric value randomly allocated to the data is less than or equal to the preset threshold, the control subunit 60 may control the RB to defer transmitting the data, and when the numeric value randomly allocated to the data is greater than the preset threshold, the control subunit 60 may control the to-be-controlled RB to prohibit transmitting the data. Likewise, in a transmission process for triggering a BSR, when a numeric value randomly allocated to the BSR is less than or equal to a preset threshold, the control subunit 60 may control the to-be-controlled RB to defer triggering the BSR when the BSR trigger condition is met, and when the numeric value randomly allocated to the BSR is greater than the preset threshold, the control subunit 60 may control the to-be-controlled RB to immediately trigger the BSR when the BSR trigger condition is met, where deferring triggering the BSR may be triggering the BSR after a deferral timer time expires. In a transmission process for transmitting a BSR, when a numeric value randomly allocated to the BSR is less than or equal to a preset threshold, the control subunit 60 may control the to-be-controlled RB to prohibit transmitting the BSR when a BSR transmission condition is met, and when the numeric value randomly allocated to the BSR is greater than the preset threshold, the control subunit 60 may control the to-be-controlled RB to immediately transmit the BSR when the BSR transmission condition is met. In a process for triggering an SR, when a numeric value randomly allocated to the SR is less than or equal to a preset threshold, the control subunit 60 may control the to-be-controlled RB to prohibit triggering the SR when an SR transmission condition is met, and when the numeric value randomly allocated to the SR is greater than the preset threshold, the control subunit 60 controls the RB to immediately trigger the SR when the SR transmission condition is met. In a process for transmitting an SR, when a numeric value randomly allocated to the SR is less than or equal to a preset threshold, the control subunit 60 may control the to-be-controlled RB to prohibit transmitting the SR when an SR transmission condition is met, and when the numeric value randomly allocated to the SR is greater than the preset threshold, the control subunit 60 may control the to-be-controlled RB to immediately transmit the SR when the SR transmission condition is met. In a process for triggering an RA, when a numeric value randomly allocated to the RA is less than or equal to a preset threshold, the control subunit 60 may control the to-be-controlled RB to prohibit triggering the RA when an RA transmission condition is met, and when the numeric value randomly allocated to the RA is greater than the preset threshold, the control subunit 60 may control the to-be-controlled RB to immediately trigger the RA when the RA transmission condition is met. In a process for transmitting an RA, when a numeric value randomly allocated to the RA is less than or equal to a preset threshold, the control subunit 60 may control the to-be-controlled RB to prohibit transmitting the RA when an RA transmission condition is met, and when the numeric value randomly allocated to the RA is greater than the preset threshold, the control subunit 60 controls the to-be-controlled RB to immediately transmit the RA when the RA transmission condition is met. A transmission mode in which the to-be-controlled RB is controlled according to the determining result to transmit the data is not limited to the embodiment described above. The transmission mode may be changed according to an instruction carried in a specific transmission control instruction.

Figure 13:
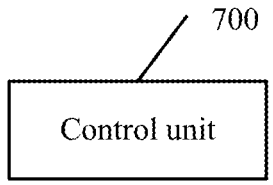
FIG. 13 is a structural diagram of still another embodiment of a terminal device according to the present invention.

Referring to FIG. 13, FIG. 13 shows a terminal device provided by an embodiment of the present invention. As shown in FIG. 13, the terminal device in this embodiment may include:

a control unit 700, configured to: when the terminal device controls the to-be-controlled RB to transmit a BSR to a base station and receives a control instruction returned by the base station, control, according to the control instruction, the to-be-controlled RB to transmit the BSR to the base station.

Specifically, in this embodiment, when the to-be-controlled RB meets a BSR trigger condition, reference may be made to the BSR trigger conditions described in the embodiment of the resource scheduling mechanism in the LTE system. 1. A BSR is triggered when a logical channel with a higher priority has transmittable data. 2. A BSR is triggered when data increases from zero (that is, all logical channels previously do not have transmittable data, and then a certain logical channel has transmittable data). 3. When the UE is in an uplink synchronization state, the base station configures a periodic BSR timer for the UE. After the timer expires, a process of scanning logical channels by the UE is triggered, and the UE obtains an uplink transmission data size of the UE and then triggers a BSR. When the RB meets any one of the foregoing conditions, a BSR is triggered. After the BSR is triggered, when the UE acquires an uplink resource, the control unit 700 may apply the transmission control parameter to control whether to immediately transmit the BSR. When the BSR is controlled to be transmitted immediately, the control unit 700 transmits the BSR to the base station. It is understandable that BSR triggering and transmission in this embodiment may comply with the prior art. In this embodiment, the base station may further comprehensively determine, according to terminal information or service data or the like carried in the BSR, whether to control reception and return the control instruction. The control instruction returned by the base station may include a deferral instruction and a barring instruction. After the BSR is transmitted, if the control instruction returned by the base station and received by the UE is a deferral instruction, where the deferral instruction includes a deferral time parameter, the control unit 700 starts a transmission deferral timer, and after the timer expires, the control unit 700 controls the UE to transmit the BSR or data. Further, after the BSR is transmitted, if the control instruction returned by the base station and received by the UE is a barring instruction, the control unit 700 controls the UE not to transmit the BSR or data any longer.

Further, in the embodiment of the present invention, the BSR may include at least one logical channel group LCG. The base station may return the barring instruction in the control instruction to instruct to bar reception of one or more LCGs in the BSR, or return the deferral instruction in the control instruction to defer reception of one or more LCGs in the BSR or the like, or return a cancellation instruction in the control instruction to cancel a control operation on one or more LCGs in the BSR or the like, where the control instruction carries at least one LCG identifier. When the UE receives the barring instruction returned by the base station, and the barring instruction carries an LCG identifier, the control unit 700 determines a to-be-controlled LCG according to the LCG identifier. After the UE acquires the to-be-controlled LCG, the control unit 700 controls the RB to prohibit transmitting the to-be-controlled LCG to the base station. When the UE receives the deferral instruction returned by the base station, and the deferral instruction carries an LCG identifier and a time parameter carried in the deferral instruction, the control unit 700 determines a to-be-controlled LCG according to the LCG identifier and acquires the time parameter. After the UE acquires the to-be-controlled LCG, the UE controls the RB not to transmit the to-be-controlled LCG to the base station any longer within a time indicated by the time parameter. Alternatively, after the UE acquires the to-be-controlled LCG, the control unit 700 randomly generates a time within a time indicated by the time parameter, and the control unit 700 controls the to-be-controlled RB not to transmit the to-be-controlled LCG to the base station any longer within the randomly generated time. When the UE receives the cancellation instruction returned by the base station, and the cancellation instruction carries an LCG identifier, the control unit 700 determines a to-be-controlled LCG according to the LCG identifier. After the UE acquires the LCG to be controlled by the cancellation instruction, the control unit 700 cancels a control operation on the to-be-controlled LCG. For example, if the control unit 700 previously controls deferred transmission of a certain LCG, after the UE receives the cancellation instruction, the control unit 700 cancels the control on deferred transmission of the LCG.

Further, in the embodiment of the present invention, the LCG may include at least one logical channel LCH. The base station may return the barring instruction in the control instruction to instruct to bar reception of one or more LCHs in the LCG, or return the deferral instruction in the control instruction to defer reception of one or more LCHs in the LCG or the like, or return a cancellation instruction in the control instruction to cancel a control operation on one or more LCHs in the LCG or the like, where the control instruction carries at least one LCH identifier. When the UE receives the barring instruction returned by the base station, and the barring instruction carries an LCH identifier, the control unit 700 determines, according to the LCH identifier, an LCH to be controlled by the barring instruction. After the UE acquires the LCH to be controlled by the barring instruction, the control unit 700 controls the RB to prohibit transmitting the to-be-controlled LCH to the base station. When the UE receives the deferral instruction returned by the base station, and the deferral instruction carries an LCH identifier and a time parameter, the control unit 700 determines, according to the LCH identifier, an LCH to be controlled by the deferral instruction. After the UE acquires the LCH to be controlled by the deferral instruction, the UE controls the RB not to transmit the to-be-controlled LCH to the base station any longer within a time indicated by the time parameter. Alternatively, after the UE acquires the LCH to be controlled by the deferral instruction, the control unit 700 randomly generates a time within a time indicated by the time parameter, and the control unit 700 controls the RB not to transmit, within the randomly generated time, the LCH to be controlled by the deferral instruction to the base station any longer. When the UE receives the cancellation instruction returned by the base station, and the cancellation instruction carries an LCH identifier, the control unit 700 determines, according to the LCH identifier, an LCH to be controlled by the cancellation instruction. After the UE acquires the LCH to be controlled by the cancellation instruction, the control unit 700 cancels a control operation on the to-be-controlled LCH. For example, if the UE previously controls deferred transmission of a certain LCH, after the UE receives the cancellation instruction, the control unit 700 cancels the control on deferred transmission of the LCH.

Figure 14:
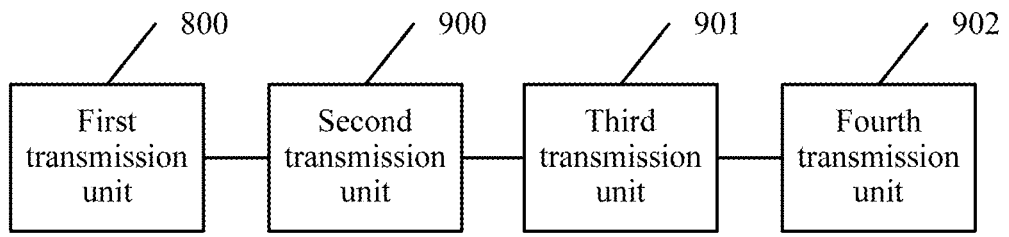
FIG. 14 is a structural diagram of an embodiment of a base station according to the present invention.

Referring to FIG. 14, FIG. 14 shows a base station provided by an embodiment of the present invention. As shown in FIG. 14, the base station in this embodiment may include:

A first transmission unit 800 is configured to transmit at least one transmission control parameter to a terminal device, so that the terminal device applies the transmission control parameter to control data transmission when the terminal device needs to initiate data transmission.

Specifically, in this embodiment, the base station may generate a transmission control parameter for controlling data transmission of different UEs. The transmission control parameter includes an instruction for controlling a data transmission form, for example, an instruction for transmitting data immediately, an instruction for transmitting data regularly, an instruction for prohibiting transmitting data, and an instruction for deferring transmitting data. The control parameter may carry at least one UE identifier and at least one RB identifier. The base station also identifies the to-be-controlled UE and a to-be-controlled RB by using the UE identifier and the RB identifier. The RB identifier may be an ID of an RB or an ID of an RB group. Further, the RB identifier may be an LCH ID, and the base station identifies, by using the LCH ID, an RB including the LCH ID; or the RB identifier may be an LCG ID, and the base station identifies, by using the LCG ID, an RB including the LCG ID; or the RB identifier may be a QCI.

Further, the transmission control parameter may further carry a data type identifier, and the UE identifies to-be-controlled data by acquiring the data type identifier in the transmission control parameter, and configures the transmission control parameter for to-be-controlled data of an identified data type. Specifically, for example, the data type identifier may include a BSR trigger type, a BSR transmission type, an SR trigger type, and an SR transmission type, where the data type identifier may include one or more data types. When the data type identifier carried in the transmission control parameter is a BSR trigger type identifier, the UE identifies the BSR trigger identifier and acquires that the data to be controlled by the transmission control parameter is BSR trigger data, that is, when the UE triggers a BSR, the UE may control a BSR trigger process of the UE according to the transmission control parameter. When the data type identifier carried in the transmission control parameter is a BSR transmission type identifier, the UE identifies the BSR transmission type identifier and acquires that the transmission control parameter is BSR transmission data, that is, when the UE transmits a BSR, the UE may control a BSR transmission process according to the transmission control parameter carrying the BSR transmission type identifier. Likewise, identification and control processes of the transmission control parameter carrying an SR trigger type identifier or an SR transmission type identifier are the same as above and are not repeated herein.

Further, for example, specific information in the transmission control parameter, or a control result reflected when the transmission control parameter is applied by the UE, may be: when a BSR trigger condition of the UE is met, the UE applies the transmission control parameter of the to-be-controlled RB to control the to-be-controlled RB to defer triggering a BSR for a predetermined time when a signal indicating that the BSR trigger condition is met is received, where the transmission control parameter includes a parameter instruction for controlling deferred triggering of the BSR. Further, when the BSR trigger condition of the UE is met, and an uplink resource is available for transmitting the BSR, the UE may apply the transmission control parameter of the to-be-controlled RB to control the to-be-controlled RB to prohibit transmitting the BSR when a signal indicating that an uplink resource is available for transmission is received. Likewise, the UE may apply the transmission control parameter of the to-be-controlled RB to control the to-be-controlled RB to defer triggering a BSR or an SR or an RA for a predetermined time when a BSR or SR or RA trigger condition is met (or not met); or the UE may apply the transmission control parameter of the to-be-controlled RB to control the to-be-controlled RB to transmit a BSR or an SR or an RA or data immediately when a BSR or SR or RA or data transmission condition is met (or not met); or the UE may apply the transmission control parameter of the to-be-controlled RB to control the RB to prohibit transmitting an SR or an RA or data when a BSR or SR or RA or data transmission condition is met (or not met). Further, a deferral timer may be included for deferring transmitting the BSR or SR or RA or data. When the time during which the BSR or SR or RA or data is deferred under control of the UE exceeds the deferral timer, the UE transmits the BSR or SR or RA or data. A length of the deferral timer may be configured in the transmission control parameter by the base station, or may be obtained according to a certain rule and based on a length configured in the transmission control parameter. For example, the length of the timer is a randomly generated value from 0 to the length configured in the transmission control parameter. The specific rule is not limited herein.

We can understand from above that the transmission control parameter may control the resource request and scheduling of the UE. When the UE is in a case of network congestion, the base station controls resource scheduling of different UEs by generating a transmission control parameter, to ensure effective data transmission of high-priority users or users that require emergency calls. Therefore, the base station may provide differentiated services for different users, and user experience is improved effectively.

Further, specific information carried in the transmission control parameter may further achieve the following control objective. When the transmission control parameter is applied by the UE, the transmission control parameter controls the UE to randomly allocate a numeric value to the data, and the transmission control parameter controls the UE to generate a threshold (or the transmission control parameter carries a threshold). Further, the UE determines whether the numeric value randomly allocated to the data is less than a preset threshold, so that the UE controls, according to a determining result, the to-be-controlled RB to transmit the data. In an actual application, for example, that the UE controls, according to a determining result, the to-be-controlled RB to transmit the data, may be: in the data transmission process, when the numeric value randomly allocated to the data is less than or equal to the preset threshold, the UE may control the to-be-controlled RB to defer transmitting the data, and when the numeric value randomly allocated to the data is greater than the preset threshold, the UE may control the RB to prohibit transmitting the data. Likewise, in a transmission process for triggering a BSR, when a numeric value randomly allocated to the BSR is less than or equal to a preset threshold, the UE may control the to-be-controlled RB to defer triggering the BSR when the BSR trigger condition is met, and when the numeric value randomly allocated to the BSR is greater than the preset threshold, the UE may control the to-be-controlled RB to immediately trigger the BSR when the BSR trigger condition is met, where deferring triggering the BSR may be triggering the BSR after a deferral timer time expires. In a transmission process for transmitting a BSR, when a numeric value randomly allocated to the BSR is less than or equal to a preset threshold, the UE may control the to-be-controlled RB to prohibit transmitting the BSR when a BSR transmission condition is met, and when the numeric value randomly allocated to the BSR is greater than the preset threshold, the UE may control the to-be-controlled RB to immediately transmit the BSR when the BSR transmission condition is met. In a process for triggering an SR, when a numeric value randomly allocated to the SR is less than or equal to a preset threshold, the UE may control the to-be-controlled RB to prohibit triggering the SR when an SR transmission condition is met, and when the numeric value randomly allocated to the SR is greater than the preset threshold, the UE may control the to-be-controlled RB to immediately trigger the SR when the SR transmission condition is met. In a process for transmitting an SR, when a numeric value randomly allocated to the SR is less than or equal to a preset threshold, the UE may control the to-be-controlled RB to prohibit transmitting the SR when an SR transmission condition is met, and when the numeric value randomly allocated to the SR is greater than the preset threshold, the UE may control the to-be-controlled RB to immediately transmit the SR when the SR transmission condition is met. In a process for triggering an RA, when a numeric value randomly allocated to the RA is less than or equal to a preset threshold, the UE may control the to-be-controlled RB to prohibit triggering the RA when an RA transmission condition is met, and when the numeric value randomly allocated to the RA is greater than the preset threshold, the UE may control the RB to immediately trigger the RA when the RA transmission condition is met. In a process for transmitting an RA, when a numeric value randomly allocated to the RA is less than or equal to a preset threshold, the UE may control the to-be-controlled RB to prohibit transmitting the RA when an RA transmission condition is met, and when the numeric value randomly allocated to the RA is greater than the preset threshold, the UE controls the to-be-controlled RB to immediately transmit the RA when the RA transmission condition is met. A transmission mode in which the to-be-controlled RB is controlled according to the determining result to transmit the data is not limited to the embodiment described above. The transmission mode may be changed according to an instruction carried in a specific transmission control instruction.

A second transmission unit 900 is configured to transmit information to the terminal device, where the information carries the at least one transmission control parameter, and the information includes at least one of a system broadcast message, a paging message, an RRC message, or a MAC message.

Specifically, in this embodiment, when the base station transmits the information to the UE, the information may carry a transmission control parameter. The information may be at least one of the system broadcast message, paging message, RRC message, and MAC message transmitted by the base station. The base station configures the transmission control parameter for a to-be-controlled RB of the UE by using the information in the at least one of the system broadcast message, paging message, RRC message, and MAC message.

A third transmission unit 901 is configured to transmit a command for enabling the transmission control parameter of the to-be-controlled RB to the terminal device.

Specifically, in this embodiment, the base station transmits the transmission control parameter to the UE by using the foregoing embodiment, and transmits an instruction to the UE, instructing the UE not to enable the transmission control parameter until the UE receives the enable command transmitted by the base station. The enable command may be an explicit command, or may be implicit system overload information, which is not limited herein.

We can understand from above that, in the embodiment of the present invention, the base station transmits the enable command to instruct the UE to enable the transmission control parameter to control data transmission, which improves flexibility of controlling data transmission by the UE.

A fourth transmission unit 902 is configured to return a control instruction according to the BSR when the base station receives the BSR that the UE controls the to-be-controlled RB to transmit.

Specifically, in this embodiment, the control instruction returned by the base station may include a deferral instruction and a barring instruction. When the base station receives the BSR that the UE controls the to-be-controlled RB to transmit, if the base station determines, according to the BSR, that the BSR may not be received temporarily, the base station may refuse to receive the BSR, and return a deferral instruction, where the deferral instruction includes a deferral time parameter. Therefore, after receiving the deferral instruction, the UE starts a transmission deferral timer, and does not transmit the BSR until the timer expires. Further, when the base station receives the BSR that the UE controls the to-be-controlled RB to transmit, if the base station determines, according to the BSR, that the BSR may be refused to be received, the base station may refuse to receive the BSR, and return a barring instruction, so that the UE does not transmit the data any longer.

Further, in the embodiment of the present invention, the LCG may include at least one logical channel group LCH. The base station may return the barring instruction in the control instruction to instruct to bar reception of one or more LCHs in the LCG, or return the deferral instruction in the control instruction to defer reception of one or more LCHs in the LCG or the like, or return a cancellation instruction in the control instruction to cancel a control operation on one or more LCHs in the LCG or the like, where the control instruction carries at least one LCH identifier. When the base station receives the BSR that the UE controls the RB to transmit, if the base station determines, according to the BSR, that a certain LCH or a plurality of LCHs in a certain LCG or a plurality of LCGs in the BSR may not be received temporarily, the base station may refuse to receive the certain LCH or the plurality of LCHs in the BSR, and return a deferral instruction, where the deferral instruction carries an identifier of the certain LCH or the plurality of LCHs refused to be received, and may further carry a deferral time parameter, so that after the UE receives the deferral instruction, the UE acquires the LCH identifier carried in the deferral instruction and the time parameter carried in the deferral instruction, and determines a to-be-controlled LCH according to the LCH identifier. After the UE acquires the to-be-controlled LCH, the UE controls the to-be-controlled RB not to transmit the to-be-controlled LCH to the base station any longer within a time indicated by the time parameter. Alternatively, after the UE acquires the to-be-controlled LCH, the UE randomly generates a time within a time indicated by the time parameter, and the UE controls the to-be-controlled RB not to transmit the to-be-controlled LCH to the base station any longer within the randomly generated time. A transmission deferral timer is started, and after the timer expires, the UE transmits the BSR. Further, when the base station receives the BSR that the UE controls the RB to transmit, if the base station determines, according to the BSR, that a certain LCH or a plurality of LCHs in a certain LCG or a plurality of LCGs in the BSR may be refused to be received, the base station may refuse to receive the certain LCH or the plurality of LCHs in the BSR, and return a barring instruction, where the barring instruction carries an identifier of the certain LCH or the plurality of LCHs refused to be received, so that after the UE receives the barring instruction, the UE acquires the LCH identifier carried in the barring instruction, and confirms a to-be-controlled LCH according to the LCH identifier. After the UE acquires the to-be-controlled LCH, the UE controls the to-be-controlled RB not to transmit the to-be-controlled LCH any longer. Further, when the base station needs to receive a certain LCH or a plurality of LCHs deferred or barred in the BSR, the base station may transmit a cancellation instruction to the UE, where the cancellation instruction carries an identifier of the certain LCH or the plurality of LCHs deferred or barred, so that when the UE receives the cancellation instruction, the UE cancels a control operation on the to-be-controlled LCH.

In the present invention, the embodiments corresponding to FIG. 10 to FIG. 14 are all applicable to the resource scheduling mechanism in the LTE system in the embodiment corresponding to FIG. 1.

Figure 15:
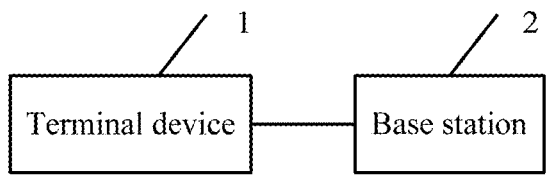
FIG. 15 is a structural diagram of an embodiment of a system according to the present invention.

Referring to FIG. 15, FIG. 15 shows a system provided by an embodiment of the present invention. As shown in FIG. 15, the system in this embodiment may include the foregoing base station 1 and terminal device 2.

Figure 16:
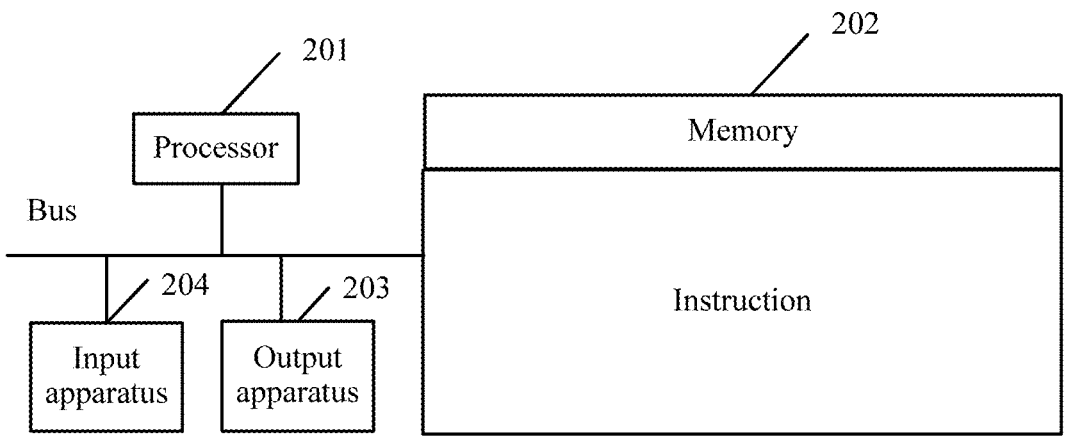
FIG. 16 is a structural diagram of an embodiment of a terminal device according to the present invention.

Referring to FIG. 16, FIG. 16 shows a terminal device provided by an embodiment of the present invention. As shown in FIG. 16, the terminal device in this embodiment may include:

a first processor 201 (a quantity of first processors 201 in the terminal device may be one or more, and one first processor is used as an example in FIG. 16), a memory 202, an output apparatus 203, and an input apparatus 204. In the embodiment of the present invention, the first processor 201, the memory 202, the output apparatus 203, and the input apparatus 204 may be connected by a bus or in other manners, where the memory 202 stores an application program executed by the processor.

The first processor 201 performs the following steps:

controlling the input apparatus 204 to receive at least one transmission control parameter transmitted by a base station; and when data transmission needs to be initiated to the base station, applying the transmission control parameter to control data transmission.

In the embodiment of the present invention, the controlling, by the first processor 201, the input apparatus 204 to receive at least one transmission control parameter transmitted by a base station, includes: controlling the input apparatus 204 to receive information transmitted by the base station, where the information includes at least one of a system broadcast message, a paging message, an RRC message, or a MAC message; and parsing the information to acquire the at least one transmission control parameter.

In the embodiment of the present invention, the transmission control parameter carries a radio bearer RB identifier.

In the embodiment of the present invention, before the applying, by the first processor 201, the transmission control parameter to control data transmission when data transmission needs to be initiated to the base station, the first processor includes: controlling the input apparatus 204 to acquire the RB identifier carried in the transmission control parameter; and determining that an RB identified by the RB identifier carried in the transmission control parameter is an RB to be controlled by the transmission control parameter.

In the embodiment of the present invention, before the applying, by the first processor 201, the transmission control parameter to control data transmission when data transmission needs to be initiated to the base station, the first processor further includes: controlling the input apparatus 204 to receive a command, transmitted by the base station, for enabling the transmission control parameter of the to-be-controlled RB.

In the embodiment of the present invention, the applying, by the first processor 201, the transmission control parameter to control data transmission, includes: applying the transmission control parameter of the to-be-controlled RB to control the to-be-controlled RB to transmit the data to the base station.

In the embodiment of the present invention, before the applying, by the first processor 201, the transmission control parameter to control data transmission when data transmission needs to be initiated to the base station, the first processor includes: determining whether the data meets a preset transmission condition; and if the data meets the preset transmission condition, performing the step of applying the transmission control parameter to control data transmission.

In the embodiment of the present invention, the applying, by the first processor 201, the transmission control parameter to control data transmission, includes:

randomly allocating a numeric value to the data according to the transmission control parameter; determining whether the numeric value is less than a preset threshold; and controlling, according to a determining result, the to-be-controlled RB to transmit the data.

In the embodiment of the present invention, the data includes a buffer status report data BSR; and the first processor 201 further performs the following step:

when controlling the to-be-controlled RB to transmit the BSR to the base station and controlling the input apparatus 204 to receive a control instruction returned by the base station, controlling, according to the control instruction, the to-be-controlled RB to transmit the BSR to the base station.

In the embodiment of the present invention, the BSR includes at least one logical channel group LCG, where the LCG includes at least one logical channel LCH; and the control instruction carries at least one LCG identifier and/or at least one LCH identifier.

The controlling, by the first processor 201 according to the control instruction, the to-be-controlled RB to transmit the BSR to the base station, includes:

controlling the input apparatus 204 to acquire the LCG identifier and/or the LCH identifier carried in the control instruction; determining that an LCG and/or an LCH identified by the LCG identifier and/or LCH identifier are/is the LCG and/or LCH to be controlled by the control instruction; and controlling, according to the control instruction, the to-be-controlled RB to transmit the to-be-controlled LCG and/or LCH to the base station.

In the embodiment of the present invention, the transmission control parameter carries a data type identifier. Before the applying, by the first processor 201, the transmission control parameter to control data transmission when data transmission needs to be initiated to the base station, the first processor includes:

controlling the input apparatus 204 to acquire the data type identifier carried in the transmission control parameter; and determining that a data type identified by the data type identifier carried in the transmission control parameter is a data type to be controlled by the transmission control parameter.

Figure 17:
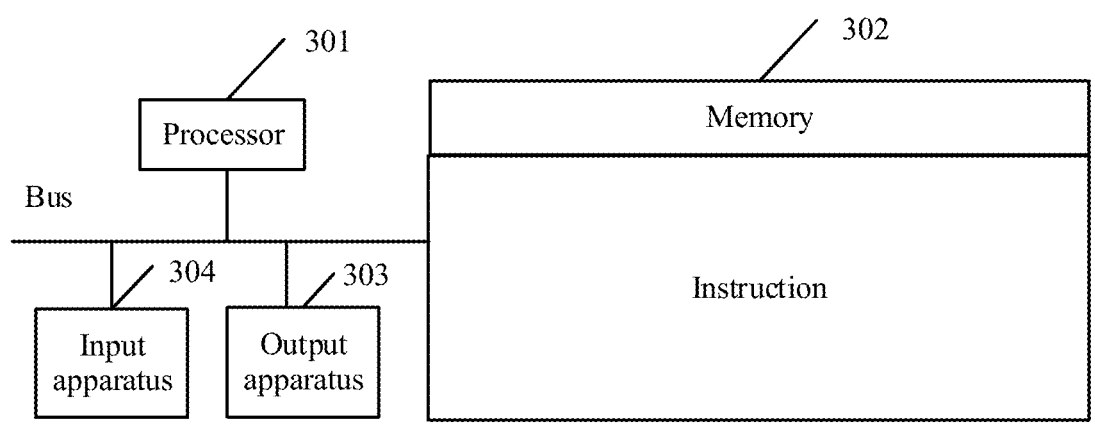
FIG. 17 is a structural diagram of an embodiment of a base station according to the present invention.

Referring to FIG. 17, FIG. 17 shows a base station provided by an embodiment of the present invention. As shown in FIG. 19, the base station in this embodiment may include:

a second processor 301 (a quantity of second processors 301 in the base station may be one or more, and one second processor is used as an example in FIG. 17), a memory 302, an output apparatus 303, and an input apparatus 304. In the embodiment of the present invention, the second processor 301, the memory 302, the output apparatus 303, and the input apparatus 304 may be connected by a bus or in other manners, where the memory 302 stores an application program executed by the processor.

The second processor 301 performs the following step:

controlling the output apparatus 303 to transmit at least one transmission control parameter to a terminal device, so that the terminal device applies the transmission control parameter to control data transmission when the terminal device needs to initiate data transmission.

In the embodiment of the present invention, the second processor 301 is further configured to perform the following operation:

controlling the output apparatus 303 to transmit information to the terminal device, where the information carries the at least one transmission control parameter, and the information includes at least one of a system broadcast message, a paging message, an RRC message, or a MAC message.

In the embodiment of the present invention, the transmission control parameter carries at least one RB identifier.

In the embodiment of the present invention, after the controlling, by the second processor 301, the output apparatus 303 to transmit at least one transmission control parameter to the terminal device, the second processor includes the following step:

controlling the output apparatus 303 to transmit a command for enabling the transmission control parameter of a to-be-controlled RB to the terminal device.

In the embodiment of the present invention, the data includes a BSR. The second processor 301 is further configured to perform the following operation: when the input apparatus 304 receives the BSR that the terminal device controls the to-be-controlled RB to transmit, controlling the output apparatus 303 to return a control instruction according to the BSR.

In the embodiment of the present invention, the BSR includes at least one logical channel group LCG, where the LCG includes at least one logical channel LCH; and the control instruction carries at least one LCG identifier and/or at least one LCH identifier. The transmission control parameter carries a data type identifier.

As can be seen from above, in some feasible embodiments of the present invention, a base station configures a transmission parameter for UE, so that when initiating data transmission, the UE may apply the transmission control parameter configured by the base station to control data transmission. In the present invention, in a case of network congestion, utilization of network resources is improved effectively, flexibility of data transmission of the UE side can be improved, and a user experience effect is improved effectively.

It should be noted that, to make the description brief, the foregoing method embodiments are expressed as a series of actions. However, a person skilled in the art should appreciate that the present invention is not limited to the described action sequence, because according to the present invention, some steps may be performed in other sequences or performed simultaneously.

In addition, a person skilled in the art should also appreciate that all the embodiments described in the specification are exemplary embodiments, and the related actions and modules are not necessarily mandatory to the present invention.

In the foregoing embodiments, the description of each embodiment has respective focuses. For a part that is not described in detail in an embodiment, reference may be made to related descriptions in other embodiments.

As described above, in some feasible embodiments of the present invention, a base station configures a transmission parameter for UE, so that when initiating data transmission, the UE may apply the transmission control parameter configured by the base station to control data transmission. In the present invention, in a case of network congestion, utilization of network resources is improved effectively, flexibility of data transmission of the UE side can be improved, and a user experience effect is improved effectively.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

What is disclosed above is merely exemplary embodiments of the present invention, and certainly is not intended to limit the protection scope of the present invention. Therefore, equivalent variations made in accordance with the claims of the present invention shall fall within the scope of the present invention.

What is claimed is:

1. A method for controlling data transmission, the method comprising:

receiving, by a user equipment (UE), at least one transmission control parameter transmitted by a base station, wherein the transmission control parameter carries at least one radio bearer (RB) identifier and the at least one RB identifier identifies a to-be-controlled RB, wherein the transmission control parameter carries at least one data type identifier and the at least one data type identifier identifies a scheduling request (SR) data type as a to-be-controlled data type, and wherein:

the transmission control parameter is applied to control the to-be-controlled RB to defer, in accordance with the at least one data type identifier, triggering an SR for a predetermined time when the UE does not have an uplink resource for transmitting a buffer status report (BSR) and an SR trigger condition is met; and when the UE needs to initiate data transmission to the base station, applying, by the UE, the transmission control parameter to control data transmission.

2. The method according to claim 1, wherein receiving, by the UE, at least one transmission control parameter transmitted by the base station, comprises:

receiving, by the UE, information transmitted by the base station, wherein the information comprises at least one of a system broadcast message, a paging message, an RRC message, or a MAC message; and parsing, by the UE, the information to acquire the at least one transmission control parameter.

3. The method according to claim 2, wherein the information comprises a paging message.

4. The method according to claim 2, wherein the information comprises a MAC address.

5. The method according to claim 2, wherein the information comprises a system broadcast message.

6. The method according to claim 1, wherein applying, by the UE, the transmission control parameter to control data transmission, comprises:

applying, by the UE, the transmission control parameter to control the to-be-controlled RB to transmit the data to the base station.

7. The method according to claim 1, wherein the transmission control parameter is also applied to control the to-be-controlled RB to defer triggering a random access (RA) for a predetermined time when an RA trigger condition is met.

8. The method according to claim 1, wherein applying, by the UE, the transmission control parameter to control data transmission comprises:

randomly allocating, by the UE, a numeric value to data for the data transmission according to the transmission control parameter;

determining, by the UE, whether the numeric value is less than a preset threshold; and controlling, by the UE according to a result of determining whether the numeric value is less than the preset threshold, the to-be-controlled RB to transmit the data.

9. The method according to claim 1, further comprising:
transmitting, by the UE, the SR to the base station;
incrementing a value of an SR transmission counter;
after expiration of an SR transmission prohibit timer:
 if the value of the SR transmission counter is less than a predetermined threshold, retransmitting the SR to the base station; or
 if the value of the SR transmission counter is not less than the predetermine threshold, triggering a random access (RA) process.

10. A method for controlling data transmission, the method comprising:

transmitting, by a base station, at least one transmission control parameter to a user equipment (UE), so that the UE applies the transmission control parameter to control data transmission when the UE needs to initiate data transmission, wherein the transmission control parameter carries at least one radio bearer (RB) identifier and the at least one RB identifier identifies a to-be-controlled RB, wherein the transmission control parameter carries at least one data type identifier and the at least one data type identifier identifies a scheduling request (SR) data type as a to-be-controlled data type, and wherein:

the transmission control parameter is applied, by the UE, to control the to-be-controlled RB to defer, in accordance with the at least one data type identifier, triggering an SR for a predetermined time when the UE does not have an uplink resource for transmitting a buffer status report (BSR) and an SR trigger condition is met.

11. The method according to claim 10, wherein the method further comprises: transmitting, by the base station, information to the UE, wherein the information carries the at least one transmission control parameter, and the information comprises at least one of a system broadcast message, a paging message, an RRC message, or a MAC message.

12. The method according to claim 11, wherein the information comprises one or more of:
a paging message;
a MAC address; or
a system broadcast message.

13. The method according to claim 10, wherein the transmission control parameter is also applied, by the UE, to control the to-be-controlled RB to defer triggering a random access (RA) for a predetermined time when an RA trigger condition is met.

14. A terminal device, comprising:
an input apparatus;
an output apparatus;
a memory; and
a processor, wherein the memory stores a group of program code, and the processor is configured to invoke the program code stored in the memory to:
 control the input apparatus to receive at least one transmission control parameter transmitted by a base station, wherein the transmission control parameter carries at least one radio bearer (RB) identifier and the at least one RB identifier identifies a to-be-controlled RB, wherein the transmission control parameter carries at least one data type identifier and the at least one data type identifier identifies a scheduling request (SR) data type as a to-be-controlled data type, and wherein:
 the transmission control parameter is applied to control the to-be-controlled RB to defer, in accordance with the at least one data type identifier, triggering an SR for a predetermined time when the terminal device does not have an uplink resource for transmitting a buffer status report (BSR) and an SR trigger condition is met; and
 when data transmission needs to be initiated to the base station, apply the transmission control parameter to control data transmission.

15. The terminal device according to claim 14, wherein controlling, by the processor, the input apparatus to receive at least one transmission control parameter transmitted by the base station, comprises:

controlling the input apparatus to receive information transmitted by the base station, wherein the information comprises at least one of a system broadcast message, a paging message, an RRC message, or a MAC message; and parsing the information to acquire the at least one transmission control parameter.

16. The terminal device according to claim 14, wherein applying, by the processor, the transmission control parameter to control data transmission, comprises:

applying the transmission control parameter to control the to-be-controlled RB to transmit the data to the base station.

17. The terminal device according to claim 14, wherein the transmission control parameter is also applied to control the to-be-controlled RB to defer triggering a random access (RA) for a predetermined time when an RA trigger condition is met.

18. A base station, comprising:

an input apparatus;

an output apparatus;

a memory; and a processor, wherein the memory stores a group of program code, and the processor is configured to invoke the program code stored in the memory to:

control the output apparatus to transmit at least one transmission control parameter to a terminal device, so that the terminal device applies the transmission control parameter to control data transmission when the terminal device needs to initiate data transmission, wherein the transmission control parameter carries at least one radio bearer (RB) identifier and the at least one RB identifier identifies a to-be-controlled RB, wherein the transmission control parameter carries at least one data type identifier and the at least one data type identifier identifies a scheduling request (SR) data type as a to-be-controlled data type, and wherein:

the transmission control parameter is applied, by terminal device, to control the to-be-controlled RB to defer, in accordance with the at least one data type identifier, triggering an SR for a predetermined time when the terminal device does not have an uplink resource for transmitting a buffer status report (BSR) and an SR trigger condition is met.

19. The base station according to claim 18, wherein the processor is further configured to:

control the output apparatus to transmit information to the terminal device, wherein the information carries the at least one transmission control parameter, and the information comprises at least one of a system broadcast message, a paging message, an RRC message, or a MAC message.

20. The base station according to claim 18, wherein the transmission control parameter is applied, by terminal device, to control the to-be-controlled RB to defer triggering a random access (RA) for a predetermined time when an RA trigger condition is met.

* * * * *